US012574605B2

(12) United States Patent
Siddique et al.

(10) Patent No.: US 12,574,605 B2
(45) Date of Patent: Mar. 10, 2026

(54) SYSTEM AND METHOD FOR MULTI-USER DIGITAL INTERACTIVE EXPERIENCE

(71) Applicant: DRESSBOT INC., Toronto (CA)

(72) Inventors: Sami Siddique, Mississauga (CA); Brad Stimpson, Beeton (CA)

(73) Assignee: DRESSBOT INC., Toronto (CA)

( * ) Notice: Subject to any disclaimer, the term of this patent is extended or adjusted under 35 U.S.C. 154(b) by 0 days.

(21) Appl. No.: 18/530,749

(22) Filed: Dec. 6, 2023

(65) Prior Publication Data

US 2024/0357208 A1 Oct. 24, 2024

Related U.S. Application Data

(60) Continuation of application No. 17/890,892, filed on Aug. 18, 2022, now Pat. No. 11,889,159, which is a (Continued)

(51) Int. Cl.
*H04N 21/4788* (2011.01)
*H04L 12/18* (2006.01)
(Continued)

(52) U.S. Cl.
CPC ..... *H04N 21/4788* (2013.01); *H04L 12/1822* (2013.01); *H04L 65/1069* (2013.01);
(Continued)

(58) Field of Classification Search
CPC ...... H04N 21/4788; H04N 7/15; H04N 7/157; H04N 21/43074; H04N 21/4312;
(Continued)

(56) References Cited

U.S. PATENT DOCUMENTS 5,734,589 A * 3/1998 Kostreski ......... H04N 21/23617
348/E7.071
5,841,970 A 11/1998 Tabuki
(Continued)

OTHER PUBLICATIONS

Melih, "Introducing the Interactive Broadcast Solution", TokBox Blog, TokBox Inc., 2015, 2 pages <https://tokbox.com/blog/introducing-spotlight-your-interactive-live-broadcast-solution>.
(Continued)

*Primary Examiner* — Michael Won
(74) *Attorney, Agent, or Firm* — SMART & BIGGAR LP
Isis E. Caulder

(57) ABSTRACT

Described herein are systems for providing a digital interactive experience. This includes a host server, a publisher receiving an application stream and a plurality of media streams corresponding to a first plurality of users in a publishing group, each of the media streams comprising at least one selected from the group of an audio stream and a video stream, the publisher sending the plurality of media streams to a subscriber, and the subscriber composing the application stream and at least two of the plurality of media streams into a composite stream and sending the composite stream to the first plurality of users in the publishing group, wherein the composite stream is sent simultaneously as the plurality of media streams is received.

13 Claims, 19 Drawing Sheets

Related U.S. Application Data division of application No. 16/934,946, filed on Jul. 21, 2020, now Pat. No. 11,457,283, which is a continuation of application No. 15/856,487, filed on Dec. 28, 2017, now Pat. No. 10,841,660.

(60) Provisional application No. 62/440,187, filed on Dec. 29, 2016.

(51) Int. Cl.

| | |
|---|---|
| *H04L 65/1069* | (2022.01) |
| *H04L 65/403* | (2022.01) |
| *H04L 65/611* | (2022.01) |
| *H04L 65/612* | (2022.01) |
| *H04L 65/80* | (2022.01) |
| *H04M 3/56* | (2006.01) |
| *H04N 7/15* | (2006.01) |
| *H04N 21/43* | (2011.01) |
| *H04N 21/431* | (2011.01) |

(52) U.S. Cl.

CPC .......... *H04L 65/403* (2013.01); *H04L 65/611* (2022.05); *H04L 65/612* (2022.05); *H04L 65/80* (2013.01); *H04M 3/567* (2013.01); *H04N 7/15* (2013.01); *H04N 7/157* (2013.01); *H04N 21/43074* (2020.08); *H04N 21/4312* (2013.01); *H04M 2203/5009* (2013.01)

(58) Field of Classification Search

CPC ............. H04N 21/242; H04N 21/2541; H04N 21/25816; H04N 21/4316; H04N 21/441; H04L 12/1822; H04L 65/1069; H04L 65/403; H04L 65/611; H04L 65/612; H04L 65/80; H04L 51/04; H04L 51/10; H04M 3/567; H04M 2203/5009; H04M 2201/22

See application file for complete search history.

(56) References Cited

U.S. PATENT DOCUMENTS

| | | | |
|---|---|---|---|
| 7,962,948 | B1 | 6/2011 | Girouard |
| 8,010,460 | B2 | 8/2011 | Work |
| 8,060,405 | B1 | 11/2011 | Lawrence |
| 8,117,545 | B2 | 2/2012 | Rosenbaum |
| 8,553,520 | B2 | 10/2013 | Rajasekar |
| 9,369,670 | B2 | 6/2016 | Clavel |
| 9,755,847 | B2 | 9/2017 | Clavel |
| 10,007,721 | B1 | 6/2018 | Klein |
| 2005/0038876 | A1 | 2/2005 | Chaudhuri |
| 2005/0216300 | A1 | 9/2005 | Appelman |
| 2006/0117378 | A1 | 6/2006 | Tam |
| 2007/0050822 | A1 | 3/2007 | Stevens |
| 2007/0106627 | A1 | 5/2007 | Srivastava |
| 2007/0233736 | A1 | 10/2007 | Xiong |
| 2008/0034061 | A1 | 2/2008 | Beares |
| 2008/0285948 | A1 | 11/2008 | Iwase |
| 2009/0055355 | A1 | 2/2009 | Brunner |
| 2009/0144139 | A1 | 6/2009 | Gaedcke |
| 2009/0150947 | A1 | 6/2009 | Soderstrom |
| 2010/0030578 | A1 | 2/2010 | Siddique |
| 2010/0318619 | A1* | 12/2010 | Meijer ................... G06Q 10/10 709/206 |
| 2011/0141929 | A1* | 6/2011 | Razdan ................. H04L 65/765 370/252 |
| 2011/0161130 | A1 | 6/2011 | Whalin |
| 2011/0246554 | A1 | 10/2011 | Bury |
| 2011/0246555 | A1 | 10/2011 | Hedges |
| 2012/0192258 | A1 | 7/2012 | Spencer |
| 2012/0221740 | A1* | 8/2012 | Arsenio ................. H04L 65/612 709/231 |
| 2013/0066750 | A1 | 3/2013 | Siddique |
| 2013/0073387 | A1 | 3/2013 | Heath |
| 2013/0173742 | A1* | 7/2013 | Thomas ................ H04L 65/762 709/217 |
| 2013/0185355 | A1 | 7/2013 | Tseng |
| 2013/0198383 | A1 | 8/2013 | Tseng |
| 2013/0215116 | A1 | 8/2013 | Siddique |
| 2013/0268302 | A1 | 10/2013 | Jayaram |
| 2013/0332527 | A1 | 12/2013 | Du |
| 2014/0120511 | A1 | 5/2014 | Hall |
| 2014/0129942 | A1 | 5/2014 | Rathod |
| 2014/0149244 | A1 | 5/2014 | Abhyanker |
| 2014/0173467 | A1* | 6/2014 | Clavel ................. H04L 12/1822 715/758 |
| 2014/0222912 | A1 | 8/2014 | St Clair |
| 2015/0016661 | A1* | 1/2015 | Lord ................ H04N 21/42203 382/100 |
| 2015/0245079 | A1* | 8/2015 | Tremblay ............... H04H 20/38 725/116 |
| 2015/0370830 | A1 | 12/2015 | Murphy-Chutorian |
| 2016/0191639 | A1 | 6/2016 | Dai |
| 2016/0210602 | A1 | 7/2016 | Siddique |
| 2016/0286244 | A1 | 9/2016 | Chang |
| 2016/0337718 | A1 | 11/2016 | Talbott |
| 2017/0353423 | A1 | 12/2017 | Morrison |
| 2018/0270277 | A1 | 9/2018 | Blanchard |
| 2018/0352303 | A1 | 12/2018 | Siddique |
| 2019/0141089 | A1* | 5/2019 | Loheide ............... H04N 21/242 |
| 2019/0289367 | A1* | 9/2019 | Siddiq .................. H04N 21/485 |
| 2022/0038580 | A1* | 2/2022 | Li ........................ H04L 12/1818 |
| 2023/0360315 | A1* | 11/2023 | Morris .................... H04S 7/302 |

OTHER PUBLICATIONS

"TokBox Launches Breakthrough Interactive Broadcast Solution With Fox Sports", MarketWired, Nov. 16, 2015, 1 page <https://web.archive.org/web/20180708160358/http://m.marketwired.com/press-release/tokbox-launches-breakthrough-interactive-broadcast-solution-with-fox-sports-2074251.htm>.

"TokBox Unveils Interactive Video Broadcast Platform for Producers", MarketWired, Jun. 7, 2016, 1 page <https://web.archive.org/web/20180706004303/http://m.marketwired.com/press-release/tokbox-unveils-interactive-video-broadcast-platform-for-producers-2132111.htm>.

Non-final Office Action dated Oct. 29, 2019 in corresponding U.S. Appl. No. 15/856,487 (21 pages).

Final Office Action dated Apr. 20, 2020 in corresponding U.S. Appl. No. 15/856,487 (21 pages).

Non-final Office Action and Notice of References dated Nov. 1, 2021 in U.S. Appl. No. 16/934,946 (14 pages).

Non-final Office Action and Notice of References Cited mailed Feb. 17, 2023 in U.S. Appl. No. 17/890,892 (29 pages).

* cited by examiner

400

Generates call invite message — 402

Receive call response message — 404

Call Accepted? — 406

No → END

Yes

Receive call information request message — 408

Generate information reply message — 410

Establish peer-to-peer connection — 412

1

SYSTEM AND METHOD FOR MULTI-USER DIGITAL INTERACTIVE EXPERIENCE

CROSS REFERENCE TO RELATED APPLICATIONS

This application is a continuation of U.S. patent application Ser. No. 17/890,892, filed Aug. 18, 2022, which is a division of U.S. patent application Ser. No. 16/934,946, issued Sep. 27, 2022, which is a continuation of U.S. patent application Ser. No. 15/856,487, issued Nov. 17, 2020, which claims the benefit of U.S. Provisional Application No. 62/440,187, filed Dec. 29, 2016, the entire contents of which are hereby incorporated by reference.

FIELD

The embodiments described herein relate to the field of networked systems for providing audio and video streaming, and in particular, to methods and systems providing mass user participation in an interactive experience incorporating streamed audio and video data.

INTRODUCTION

The following paragraphs are not an admission that anything discussed in them is prior art or part of the knowledge of persons skilled in the art.

Audio and video streaming is a form of multimedia experience that has become a significant component of Internet users. During a live broadcast of an event, viewers may view the event progressing at the same time, in a synchronized manner. Viewers watching the same program can therefore interact with other viewers as the live program progresses.

Video streaming of pre-recorded video and audio program is delivered to one or more viewers by a provider over a communication network in an on-demand basis. Each viewer accessing the pre-recorded video and audio may begin viewing the pre-recorded video at a different time. Each viewer may further control the playback of the video and audio differently. As such, even if several viewers are viewing the same video or audio content, they are unable to share in the same viewing experience and engage with each other during the viewing experience since each viewer is likely to be at a different point in the program.

Synchronizing an on-demand video stream to within millisecond accuracy across a diverse group of viewers is challenging. The variation in hardware, operating system, browser, and communication network access leads to time-varying download and decode capabilities. Quality of experience may be hindered if adequate measures are not taken to compensate for the variety in access methods. Also, these viewers demand easy-to-use capabilities to connect with others during the session insofar as it augments the quality of experience. In addition, event organizers market synchronized video streaming sessions as viral live events to draw large viewership to ensure adequate return on investment. This leads to large and unpredictable bursts in viewership that can overwhelm server resources. Furthermore, protecting copyright holders from theft and other damages requires strong security measures be in-place.

SUMMARY

In one broad aspect, there is provided a method of adding a user to a digital interactive experience comprising: providing an interaction system comprising: a publishing group comprising a first plurality of users each sending a media stream to a publisher and receiving the composite media stream from a subscriber, and a distribution group comprising a second plurality of users that receive a composite media stream from a distributor, wherein the subscriber sends the composite media stream to the distributor; receiving a connection request from a nominee user, establishing a connection with the nominee user and the interaction system, and adding the nominee user to the distribution group.

In some embodiments the publishing group comprises the first plurality of users wherein a first user in the first plurality of users may send the media stream to the first plurality of users.

In some embodiments instead of receiving the connection request from the nominee user, a first user in the publishing group may send an invitation to the nominee user and the nominee user is added to the publishing group.

In some embodiments the nominee user may be in the distribution group and the connection request may be a request to join the publishing group.

In some embodiments the publishing group may further comprise a moderator user receiving the connection request, a moderator user interviewing the nominee user, the moderator user approving the connection request, and the nominee user being added to the publishing group.

In some embodiments the adding the nominee user to the publishing group may further comprise: determining whether adding the nominee user to the publishing group exceeds a publishing threshold, if adding the nominee user to the publishing group exceeds the publishing threshold: adding the nominee user to the distribution group; and otherwise: adding the nominee user to the publishing group.

In some embodiments the determining whether adding the nominee user to the publishing group exceeds the publishing threshold may further comprise comparing a count of the first plurality of users of the publishing group to a publishing threshold user count.

In some embodiments the determining whether adding the nominee user to the publishing group exceeds the publishing threshold may further comprise comparing a current bandwidth of the first plurality of users in the publishing group to a publishing threshold bandwidth.

In some embodiments the method may further comprise an interactive text communication involving each user in the first plurality of users and each user in the second plurality of users.

In some embodiments the interactive text communication may further comprise a moderation by the moderator user.

In some embodiments the moderation may be automatic.

In one broad aspect, there is provided a system for providing a digital interactive experience, the system comprising: a host server, a publisher receiving an application stream and a plurality of media streams corresponding to a first plurality of users in a publishing group, the publisher sending the plurality of media streams to a subscriber, and the subscriber composing the application stream and the plurality of media streams into a composite stream and sending the composite stream to the first plurality of users in the publishing group.

In some embodiments the subscriber may send the composite stream comprising an interaction stream from each user in the first plurality of users to a distributor comprising a content delivery network, a second plurality of users in a distributor group may receive the composite stream from the content delivery network.

In some embodiments the composite stream instead comprises: an interaction stream from each user in the first plurality of users and each user in the second plurality of users.

In some embodiments the system may further comprise: a playback action comprising a user identifier, a playback event, and an action message, and wherein the first plurality of users and the second plurality of users receive the playback action and change a playback of the application stream.

In some embodiments the application stream may comprise providing a set of instructions to a user application running locally to the user.

In one broad aspect, there is provided a method of providing synchronized media, the method comprising: providing an application stream, receiving a plurality of publisher streams corresponding to a first plurality of users in a publishing group, receiving an interaction stream comprising user input from the second plurality of users in a distribution group, composing a composite media stream comprising the application stream, the plurality of publisher streams corresponding to the first plurality of users in the publishing group, and the interaction stream, sending the composite media stream to a second plurality of users in the distribution group, and wherein the composite media stream, the plurality of publisher streams corresponding to the first plurality of users in the publishing group, and the interaction stream are generally synchronous.

In some embodiments the sending the composite media stream to a plurality of users in the distribution group may comprise sending the composite media stream to a content delivery network, the content delivery network may be in communication with the plurality of users in the distribution group.

In some embodiments the first plurality of users in the publishing group may receive a first composite media stream comprising the application stream, the plurality of publisher streams corresponding to the first plurality of users in the publishing group, and the interaction stream, and the second plurality of users in the distribution group may receive a second composite media stream comprising the application stream and the interaction stream.

In some embodiments a synchronization component may send a synchronization action to the first plurality of users and the second plurality of users comprising a synchronization event and a synchronization message wherein each of the first plurality of users and a playback of the application stream may change for each of users in the second plurality of users.

In some embodiments each user in the first plurality of users and each user in the second plurality of users may receive a playback action comprising a user identifier, a playback event, and an action message, and wherein the first plurality of users and the second plurality of users receive the playback action and change the playback of the application stream.

In some embodiments the receiving the interaction stream may comprise: receiving a plurality of user input from at least one of the first plurality of users; processing the user input into the interaction stream; sending the playback action to each of the first plurality of users and each of the second plurality of users corresponding to the user input; wherein the first plurality of users and the second plurality of users may receive the playback action and may change the playback of the application stream.

In some embodiments the method may further comprise: receiving a plurality of user input from at least one of the first plurality of users and the second plurality of users; processing the user input into the interaction stream; sending the playback action to each of the first plurality of users and each of the second plurality of users corresponding to the user input; and wherein the first plurality of users and the second plurality of users may receive the playback action and may change the playback of the application stream.

In one broad aspect, there is provided a system for providing synchronized media playback, the system comprising: a host server, an application stream transmitted to a mixer, a plurality of publishers in a publisher group, the plurality of publishers transmitting a plurality of publisher streams to the mixer, a plurality of recipients in a distributor group in network communication with a distributor, the plurality of recipients transmitting a plurality of interaction streams to the mixer, the mixer composing a composite media stream comprising the plurality of publisher streams, the plurality of interaction streams, and the application stream, wherein the application stream, the composite media stream, the plurality of publisher streams, and the plurality of interaction streams are generally synchronous; and the distributor receiving the composite media stream from the mixer, and the distributor sending the composite media stream to the plurality of recipients.

In some embodiments the synchronization event may comprise a synchronization time reference and a synchronization message wherein the plurality of recipients and the plurality of publishers may receive the synchronization event from a media synchronization component, each of the plurality of recipients and each of the plurality of publishers may change a playback of the application stream; a playback action comprising a user identifier, and an action message; and wherein the plurality of publishers and the plurality of recipients receive the playback action and change the playback of the application stream.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which.

Figure 1A:
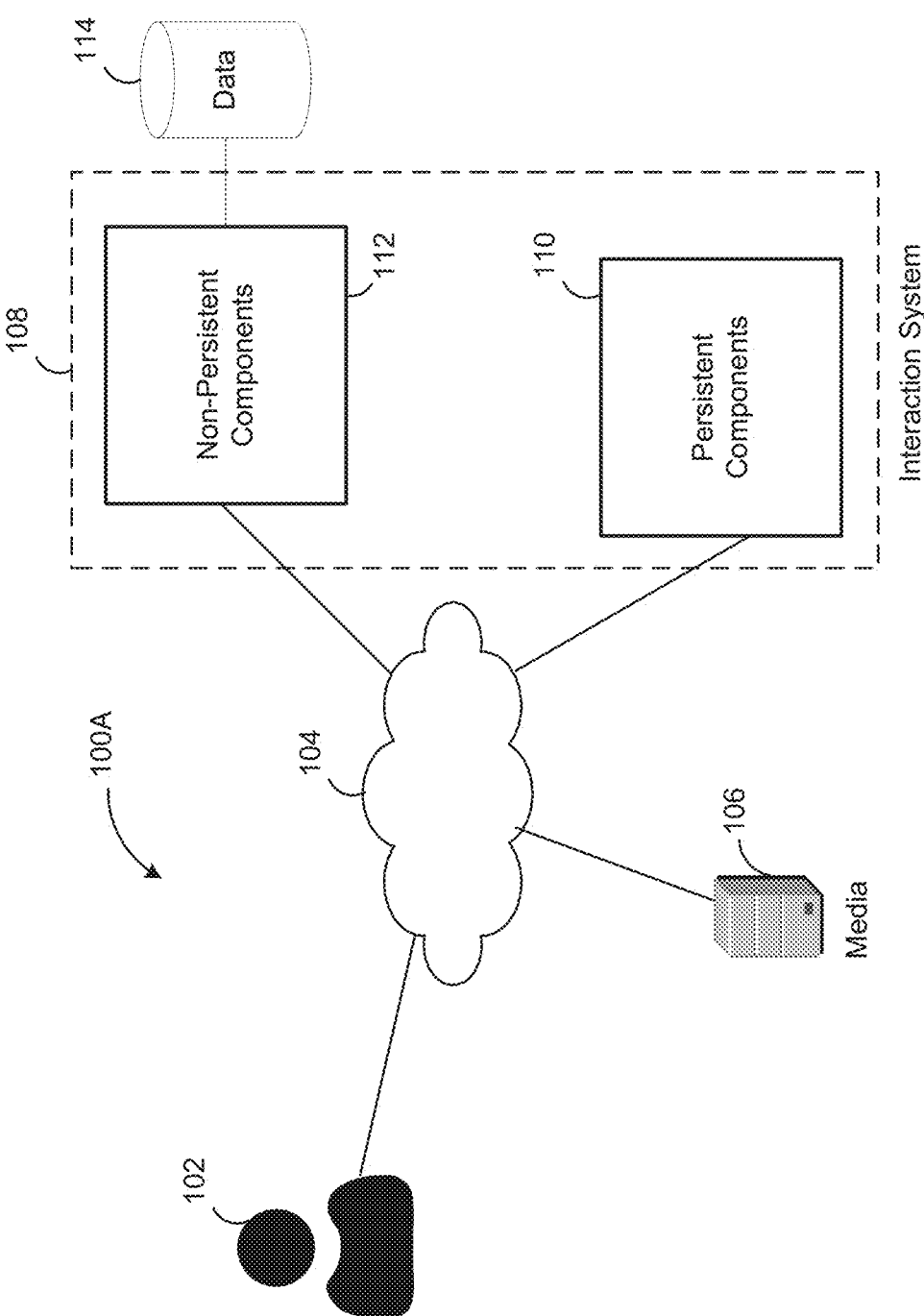
FIGS. 1A-1E are illustrations of systems for providing an interactive digital experience, according to at least one embodiment.

The skilled person in the art will understand that the drawings, described below, are for illustration purposes only. The drawings are not intended to limit the scope of the applicants' teachings in anyway. Also, it will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF VARIOUS EMBODIMENTS

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

It should be noted that terms of degree such as "substantially", "about" and "approximately" when used herein mean a reasonable amount of deviation of the modified term such that the end result is not significantly changed. These terms of degree should be construed as comprising a deviation of the modified term if this deviation would not negate the meaning of the term it modifies.

The terms "an embodiment," "embodiment," "embodiments," "the embodiment," "the embodiments," "one or more embodiments," "some embodiments," and "one embodiment" mean "one or more (but not all) embodiments of the subject matter described in accordance with the teachings herein," unless expressly specified otherwise.

The terms "including," "comprising" and variations thereof mean "including but not limited to", unless expressly specified otherwise. A listing of items does not imply that any or all of the items are mutually exclusive, unless expressly specified otherwise. In addition, the terms "a," "an" and "the" mean "one or more," unless expressly specified otherwise.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should also be noted that the terms "coupled" or "coupling" as used herein can have several different meanings depending in the context in which these terms are used. For example, the terms coupled or coupling can have a mechanical or electrical connotation. For example, as used herein, the terms coupled or coupling can indicate that two elements or devices may be directly connected to one another or connected to one another through one or more intermediate elements or devices via an electrical element or electrical signal (either wired or wireless) or a mechanical element depending on the particular context.

Further, although processes, methods, and the like may be described (in the disclosure and/or in the claims) having acts in a certain order, such processes and methods may be configured to work in alternate orders while still having utility. In other words, any sequence or order of actions that may be described does not necessarily indicate a requirement that the acts be performed in that order. The acts of processes and methods described herein may be performed in any order that is practical and has utility. Further, some actions may be performed simultaneously, if possible, while others may be optional, if possible.

When a single device or article is described herein, it may be possible that more than one device/article (whether or not they cooperate) may be used in place of a single device/article. Similarly, where more than one device or article is described herein (whether or not they cooperate), it may be possible that a single device/article may be used in place of the more than one device or article.

Referring now to FIG. 1A, shown therein is a system 100A for providing an interactive digital experience. A user or participant 102 (hereinafter "participant") may use a client software application executable on a computing device to participate in the interactive experience facilitated by an interaction system 108. Participants using the interaction system 108 may register with the system with a username and a password to generate a user profile. Upon registration, each participant may be assigned a unique identifier. The unique identifier may be used to collect user statistic and other analytical data.

The participant 102 may be using a computing device such as a desktop computer, laptop, terminal, tablet device or mobile device to view media content accessible over a communication network 104 from a media repository 106. (In another exemplary embodiment, the participant 102 may be on a dumb terminal.) The computing device may be configured to operate the client software application (e.g. Apps, Web Browser software etc.) to access the interaction system 108. The media stream may be pre-recorded media content (e.g. video or audio On-Demand "VOD"), live media content (e.g. live streams, screen shares) or a synchronous application 'app' share which resides within interaction system 108. As will be described in more detail subsequently, interaction system 108 may also be used by participant 102 to communicate with other participants or moderators during the interactive digital experience via text communication such as live text chat.

The computing devices used by the participant 102, may also be equipped with audio and image capture equipment to capture and encode digital video streams. The encoded digital streams may similarly be provided over network 104 to the media repository or to other participants (not shown) participating in the interactive digital experience via system 100A. The use of audio and image capture may further be used to communicate with other participants or moderators of the interactive digital experience using interactive video communication such as live video chat or live video conferencing.

The network 104 may be any network or network component capable of carrying data between various devices and the unified platform 233 comprising the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network (LAN), wide area network (WAN), a direct point-to-point connection, mobile data networks (e.g., Universal Mobile Telecommunications System (UMTS), 3GPP Long-Term Evolution Advanced (LTE Advanced), Worldwide Interoperability for Microwave Access (WiMAX), etc.), and others, comprising any combination of these.

Interaction system 108 may be implemented using a network-connected server coupled to a data store 114 for storing information such as user account information and preferences. The interaction system 108 may comprise of persistent components 110 and non-persistent components 112. In the present embodiment, persistent components may be used to establish persistent network connections while non-persistent components may be used to establish network connections, as will be described in further detail subsequently. In the present embodiment, data store 114 may be used to store data used by both persistent components 110 and non-persistent components 112. Persistent components 110 can directly query non-persistent components 112 for data retrieval. The interaction system 108 may be implemented using any appropriate server-side web-based framework such as but not limited to PHP, and Node.js. The participant's device (i.e. client device) may operate compatible client-side web-based frameworks comprising JQuery and React JS. The participant's device may also operate compatible client-side native mobile frameworks comprising Android and iOS.

Persistent connections may be used for continuous transfer of data, for example, media data provided by the media repository 106 or data transmitted and received for live text and video communication. Network connections between participants and the interaction system may be a low latency communication link. In some embodiments, communication channels established using WebSocket ("WS") communication over a standard TCP/IP connection may be used. The WS protocol, which is defined within the HTML5 specification, may be used to provide a full-duplex, bi-directional communication channel over a conventional HTTP connection via an upgrade protocol between an HTML5-compliant client application (e.g. the participant's 102 client software used to access the digital interactive experience) and the interaction system 108. To enhance security, the WS communication channel may be encrypted using methods know to those skilled in the art. Once a WS channel is established, data frames (text or binary) may be sent back and forth between the participant's device and the interaction system 108 in full-duplex mode.

Non-persistent connections may be used for one-time, periodic or intermittent connections with the Interaction system 108. For example, periodic non-persistent connections may be established to store relevant user and event state information such as but not limited to user status, interaction counts with application widgets and event status. In another example, non-persistent connections may be established for user authentication when the participant 102 wishes to join an interactive experience or to log-in. Inter-mittent connections may be used for administration purposes such as the participant 102 changing his or her contact information, user preferences or submit payment for paid services. These functionalities may be provided by the interaction system 109 via an Application Programming Interface (API) accessible over the network 104. The API may be accessible as a web service compliant with Representational State Transfer ("REST") to provide "RESTful" web service.

Figure 1B:
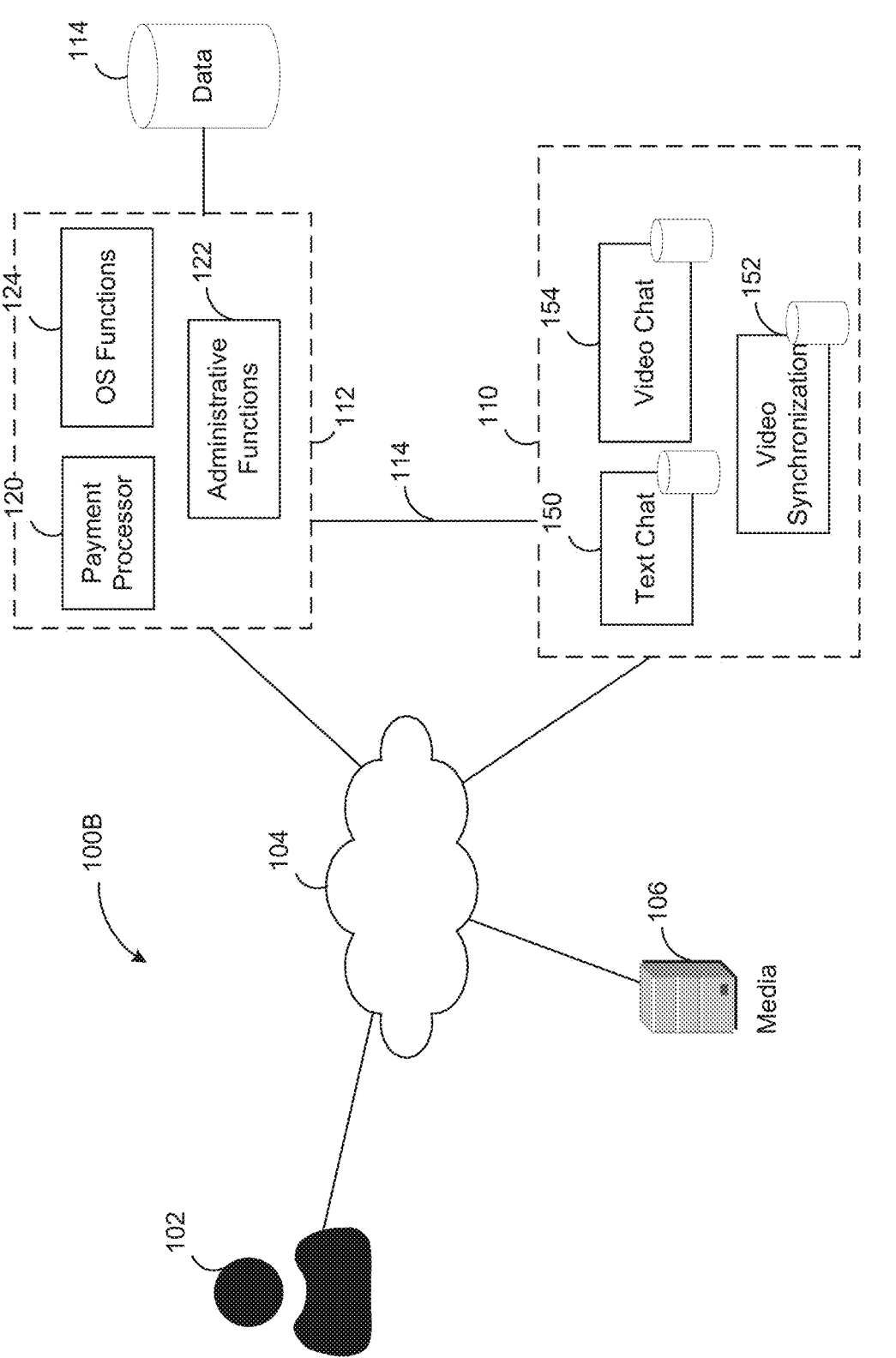

FIG. 1B shows an embodiment of system 100B which may be regarded as a variation of system 100A in which the persistent 110 and non-persistent components 112 of the interaction system 108 may be split and implemented separately. In the present embodiment, the non-persistent components 112 may be regarded as micro-services used to facilitate the interactive digital experience. For example, payment processor 120 may be used for receiving payments for paid services, and administrative functions component 122 for providing administrative features such as user account management and the like. The component OS Functions 124 can operate to manage apps (e.g. additional add-on features) within the platform and the corresponding state information such as but not limited to total apps running, last known state, and app preferences.

For the persistent components, a text chat component 150, video chat component 154 and video synchronization component 152 may be implemented to provide interactive services. The details of each component shall be described in further detail subsequently. The persistent components may also be associated with a respective data or storage component. The internal data store for each component (as shown by a cylinder associated with each component block) may be used to store customized state information that may be mutated independent of other components. For example, the text chat component 150 can store all chat messages plus customized user state information. It may be noted that persistent components 110 and non-persistent components 112 may be implemented on a server executed as separate processes or executed in a distributed manner within a cloud-based environment. To indicate the distributed nature of the system, bounding box for the interaction system 108 is not included in FIG. 1B.

Communication link 114 between persistent components 112 and non-persistent components 100 may be established to retrieve the state information to provide a corresponding persistent connection with the participant 102. Specifically, a participant 102, having authenticated with the interaction system 108, may trigger an instantiation or activation of one or more persistent connections corresponding to the persistent components for the digital interactive experience. For example, consider a digital interactive experience in which two or more participants, who may be located in different geographic locations, are watching video content together (e.g. a VOD movie or show). The participants may be watching the video content in a synchronized manner as if they were in the same place (such as a theatre). To begin this experience, each user may retrieve video data from the media repository 106. The video data may be encoded in a format that may be played back by the participant's computing device as the data is streamed to each participant using an appropriate streaming protocol. Video formats may include but not limited to H.264, HEVC, VP8 and VP9. Streaming protocols may include adaptive or non-adaptive streaming protocol such as HLS, MPEG-DASH, RTMP, Adobe HDS, Microsoft Smooth Streaming and RTSP/RTP. Adaptive streaming protocols may be used since they are capable of supporting a variety of video bitrates to accommodate different network connectivity conditions.

The video synchronization component 152 establishes a synchronized video session with the participants so that each of the participants are at the same time point within the video content. The video synchronization component 152 retrieves the state information from the non-persistent components 110 via the communication link 114 and thereafter permits a persistent connection such as a WS to be established between the video synchronization component 152 and the approved participants. The participants can then control the video content by pausing, playing and adjusting the playback time.

Figure 2A:
FIG. 2A is an image of an application interface for synchronized video playback and video chat, according to at least one embodiment.

During playback of the video content, a participant may execute one or more playback control actions such as pause, playback, or jump (e.g. to a different part of the video content) through the participant's video playback interface as shown in FIG. 2A. In some cases, a designated participant (e.g. a moderator) may be given authorization to control playback while the other participants cannot control playback. In other cases, a subset of the participants may be given authorization to control playback. In yet other cases, any participant may be given authorization to control playback.

Playback control events may be generated by the playback interface associated with a participant controlling the playback. The event may be transferred to the video synchronization component 152 over the network 104 via a persistent connection associated with that participant. The control signal may then be propagated to other participants via their respective persistent connections with the synchronization component 152. Upon receiving the control signal, the media player associated with the other participants can mirror the playback action. Further details of the synchronized playback feature will be described in further detail subsequently.

In some implementations, the video viewing experience may be enhanced by additional features such as text and/or video chat. Accordingly, additional persistent components such as a text chat component 150 and video chat 154 component may also be triggered to instantiate or activate WS connections for each participant to provide these enhanced features. For example participants may communicate with each other using text in real-time using a text chat WS provided by the text chat component 150 during playback of the video content chat or to provide written comment. Additionally, participants may communicate during playback using video chat via a video chat WS provided by the video chat component 154 such that the participant's reactions and expressions are visible to the other participants.

Figure 1C:
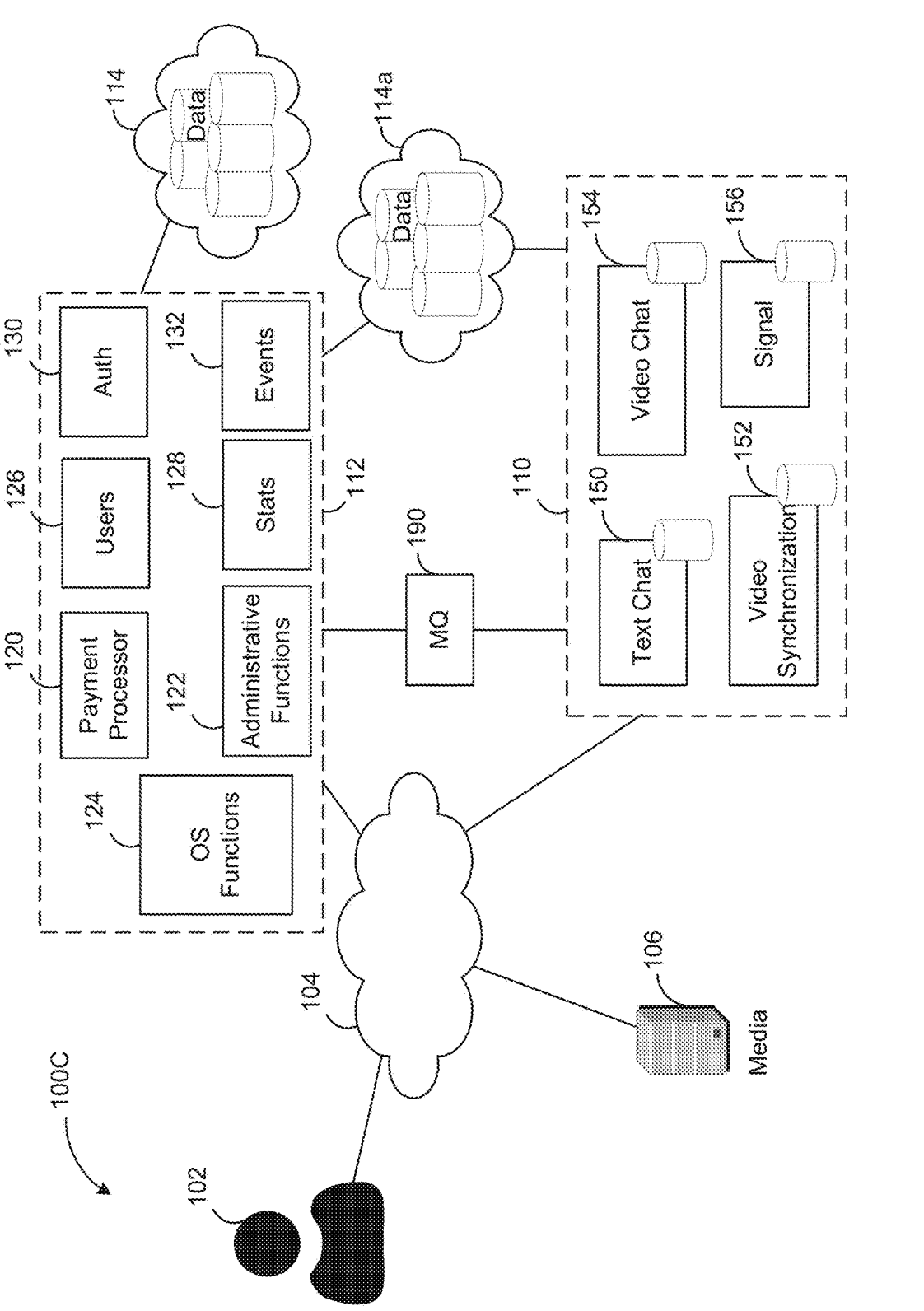
Figure 1D:
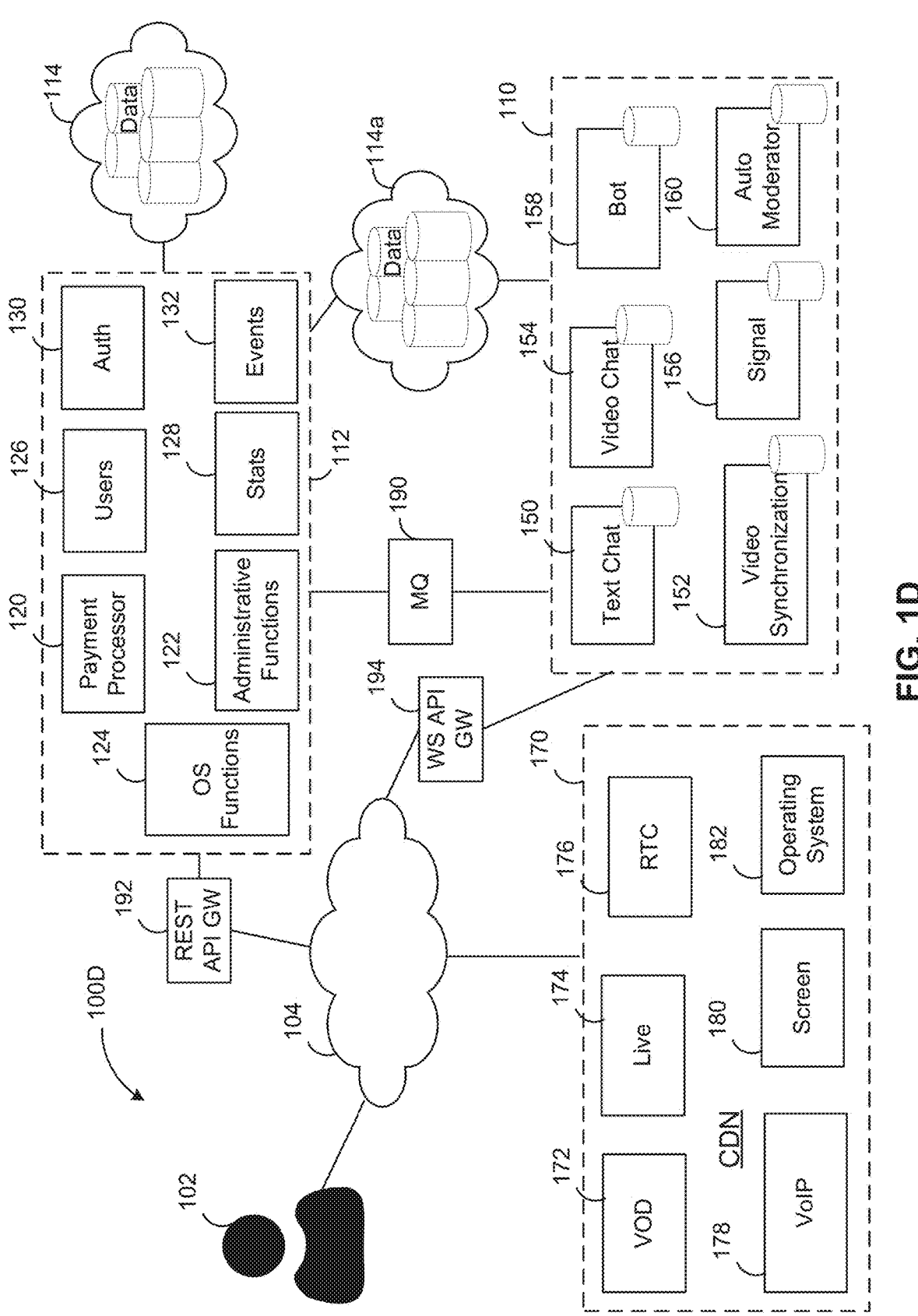

In yet other implementations, an annotation component (not shown) may be provided so that a participant may annotate or draw on the video display area to highlight portions of the display area. These annotations may be captured by the participant's interface and transmitted to the annotation component via a corresponding WS and redistributed to the other participants. The annotations may then be applied on to the video display area of the other participants at the appropriate screen locations FIGS. 1C and 1D illustrate systems 1000 and 100D which may be regarded as further variations of system 100A for providing an interactive digital experience. Each system shows further containerization of specific system services. In FIG. 1C non-persistent components 112 may be compartmentalized further to perform specialized functions rather than being configured to perform multiple tasks (see e.g. OS Functions 124 of FIG. 1B). Specialized functions may include, but not limited to, collection of user statistics with a stats component 128; scheduling and handling of one or more events using a dedicated events component 132; and user authentication using a dedicated authentication ("Auth") component 130.

Persistent components 110 may similarly be further containerized. For example, a dedicated signal component 156 may be added to generate a signal WS to the device of the participant to control participant state, and send real-time notifications. Data store 114 and 114a may also be containerized by associating data store 114 with the persistent data store requirements and data store 114a with the non-persistent data store requirements. Data stores 114 and 114a may be implemented in a distributed/clustered manner rather than using a single data store instance as shown in FIGS. 1A and 1B. Data stores 114 and 114a may be accessed from both persistent components 110 and non-persistent components 112.

The system 100C of FIG. 1C further comprises a message broker MQ 190 to facilitate communication between persistent components 110 and non-persistent components 112. The MQ may be configured into a series of queues, channels, and exchanges to manage the flow of data communications or messages between components. For example, to handle the high video chat request loads, several video chat components 154 may be instantiated. Each instance may attach to the message broker MQ 190 through a queue or channel and will thereafter receive messages in a coordinated manner.

It may be understood that certain WS connections may have higher priority than others. For example, data sent/received by the video synchronization component 152 and/or video chat component 154 may be higher priority for the overall digital interactive experience than the data sent/received by the text chat component 150 since delays in synchronization between participants may result in a less desirable experience. Accordingly, certain WS connections may be given higher priorities than others by configuring system 100C of FIG. 1C to include a tiered approach for handling WS connections using gatekeepers and workers. Gatekeepers and workers are further specialized elements of the persistent components 110. Gatekeepers may be tasked to terminate secure WS connections and forward them onwards for processing whereas workers are tasked with deciding where to forward WS. For example, in FIG. 1E an embodiment of the gatekeeper/worker may be used to route WS to video chat broadcast components 191 and 193.

FIG. 1D shows system 100D which may be regarded as a variation of the previously described systems. The media content may be provided and stored in a distributed manner using a content delivery network (CDN) 170 to provide media content to a large number of geographically distributed participants (e.g. in the hundreds, thousands, hundreds of thousands or more) using CDN nodes (not shown) that may be geographically closest to a particular participant. As such, the CDN 170 may be used to minimize delay or lag in the delivery of media content to ensure the quality of interactive experience. The CDN may be used to provide or distribute data for VOD content 172, Live streaming content 174, RTC content 176, voice data (VoIP) 178, participant screen 180 (e.g. for screen sharing experiences), and operating system data 182 (e.g. for sharing of a captured OS session). For RTC content 176, voice data 178, screen data 180, and OS data 182 may be restreamed across the CDN to broadcast to a larger viewership with relaxed interactivity constraints.

Furthermore, given that the number of participants may expand or scale from two participants to thousands, hundreds of thousands or more, dedicated gateways such as the REST API Gateway (REST API GW) 192 and the WS API Gateway (WS API GW) 194 may be used as an interface between the many participants attempting to establish network connections with the persistent components 110 and non-persistent components 112, respectively. For example the WS API GW 192 is configured to terminate all secure WS and forward to the appropriate destination, as described above. The REST API GW 192 is configured to terminate all secure HTTP requests and forward to the appropriate destination. These GWs can provide further capabilities such as but not limited to analytics, access control lists, cluster awareness, and geo-replication.

Video Playback Synchronization

As described previously, a digital interactive experience can include two or more participants (e.g. hundreds or thousands of participants) watching a video content together (e.g. a VOD movie or show). These participants may further be located in different geographic locations. Synchronizing video playback may allow the participants to watch the video content in a synchronized manner (i.e. all participants are viewing the same time point within the movie or show) as if they were in the same place (such as a theatre) or watching a live broadcast event. Countermeasures may be deployed to protect copyright holders from disapproved redistribution by encrypting the video content using digital rights management (DRM) techniques. An example DRM implementation will be described in further detail subsequently.

Figure 2B:
FIG. 2B is an image of application interfaces for synchronized video playback for various mobile devices, according to at least one embodiment.

FIG. 2A shows an application interface 200 of an example synchronization video playback experience for two participants. The application interface may include a media player 202 with a video display area 204, and a number of playback controls and indicators comprising scrubber bar 206 and progress indicator, time indicator 210, and playback control (e.g. pause/play) 212. The media player interface shown in FIG. 2A may be provided using a web browser operating on a desktop computer. However a corresponding media player interface may be provided on other devices such as a mobile phone or tablet device as shown of various screen sizes and display resolutions in FIG. 2B.

In the interface shown in FIG. 2A, participants may optionally engage with each other via video chat 220, as described in more detail subsequently, while simultaneously viewing the video content displayed in the display area 204. It may further be understood that additional participants may be added or removed as desired so that the number of participants or viewers may be scalable upwardly or downwardly.

As described previously, during a viewing session, a participant may play, pause, or seek backward/forward to different portions of the video. In response to the user's playback control actions, playback control event may be generated by the playback interface of the participant's application. The playback signal may be provided to the other participants in the viewing session. When the other participants receive the playback control signal, the video playback application (the "media player") of the other participants can control the video playback in a manner that mirrors the playback control action of the participant (e.g. pause or play the playback, or jumping around). In some cases the other participants may respond to the playback control signal with a "sync-feedback" signal. A "sync-feedback" message may be used used to ensure all participants in the viewing session are indeed synchronized.

In a two-participant context, the corresponding applications of each participant can control the media player whenever it receives a specific playback control signal. On the other hand, synchronizing a video stream across a large user base may be a complex undertaking, as the variability in user operating systems, network connections and hardware leads to variability in the playback experience. Factors that may affect the playback experience include the speed and stability of a participant's network connection. The capacity of the network connection may be determinative of the bit-rate at which a given video content may be streamed. With these variabilities and in addition to inconsistencies in the use of video decoders among the participant populations (e.g. Apple® devices may support one decoder, while Android® and Windows® devices may support a different decoder), playback may slowly become out of sync. Additionally, if there are multiple participants, other consideration of (1) queueing of the playback controls events, and avoidance (2) of signal competition.

With respect to queueing of the playback control events, the media player may process playback control events in the sequence that they were generated to mirror playback actions taken by one or a number of other participants. A queue for playback controls may be used to maintain the sequence since the media player manages media content being streamed over network 104 such as the Internet, and these playback operations cannot be furnished instantly.

Signal competition may occur when two participants attempt to control playback at the same time and can lead to sub-optimal experiences for all participants. For example two participants attempting to adjust the playback time position (i.e. seeking through the video) at the same time may lead to signal competition. Participants in the viewing session may experience uneven playback as the video jumps to sporadic playback positions. Additionally, in implementations in which a "sync-feedback" signal is provided, multiple cycles of "sync-feedback" events may be generated in response to the simultaneously generated playback control events. The number of signal transmissions may lead to an overload situation and synchronization service instability For participants with unstable network connections, competition between participants can lead to lost control events and/or control events arriving out-of-order. For example consider participants Alice and Bob who simultaneously send out two different playback control events to David and Lucy. Due to differences in the quality and stability of David's and Lucy's respective network conditions, David and Lucy could receive the two playback control events generated by Alice and Bob in different order, resulting different playback behaviors observed by David and Lucy, and thus David and Lucy may be out of synchronization. In other cases, a playback control signal may be received by a participant's media player with an unstable network connection. The participant may experience video playback abruptly jumping to a past or future moment in the video in a manner out of synchronization with the rest of the viewing audience.

In some embodiments, a master-and-slave architecture may be implemented to minimize or avoid issues related to signal competition. Specifically, within a viewing session, one participant may be elected and given "master" status. The master may be elected by various methods comprising connection-time (e.g. the first to join a viewing session), account type, available credits, vote by participants within the viewing session or by pre-selection. Once a participant has been designated master, all other participants in the viewing session may thus be designated as "slaves". During the viewing session, all slave participants may send their playback control events to the master participant who may then dictate what playback control signal will be final. In some embodiments, a list of all connected participants may be maintained in a non-persistent data store such as data store 114a of FIGS. 1C and 1D so that in the event that the master experiences a network connectivity failure, a slave may be promoted to become master.

In the master-and-slave architecture, further mechanisms may be implemented to prevent nefarious slave users from mimicking the master and sending unwanted playback control events within the viewing session. Countermeasures may include a token verification process from a centralized server or process. For example in some cases, the video synchronization component 152 may be configured to perform token verification. This centralized server may act as a gatekeeper and would rebroadcast the playback control signal to participants in the viewing session upon successful verification.

Unlike participants using browsers on desktop computers to access the interactive experience, participants using mobile devices may be more vulnerable to unstable network conditions more frequently and/or experience interruptions (e.g. incoming calls, cellular signal failure, etc.). Achieving continuous synchronization may become more complex and difficult in the increased instances of periods in which media content is being buffered/loaded, or playback control events being unreachable due to loss of data communication etc.

To serve a broader spectrum of users (e.g. those with varying qualities of network connections, devices and operating systems), the interactive system 108 may be configured to implement a signalling protocol to facilitate improved playback synchronization across desktop devices and mobile platforms. As will be described in further detail below, the signalling protocol may be used to translate event callbacks (e.g. play, pause, skip etc) of media players operating in different computing environments to a standard signal message that may be understood a centralized signaling component (e.g. the video Synchronization component 152 of FIGS. 1B, 1C and 1D), and then relayed to the appropriate participants. A signaling encoder and a corresponding decoder may be provided media player applications for each participant, enabling the application to listen to events (i.e. playback control signal messages) generated by media players of other participants and to control the playback accordingly based on these playback control signal messages.

As discussed previously, one way to keep the viewing experiences of all participants synchronized is to broadcast the playback actions to all of the other participants. In this case, if there is a participant with an unstable network connection which requires longer buffer/load times, other participants with better network connections may also be made to wait until the participant with the least stable network connection can "catch up" (i.e. buffer enough video data for playback) before playback may proceed. The other participants may be made to wait by the receiving a "buffer" event being broadcast by the participant with the unstable network connection. This situation may cause the media player for participants with relatively better network connections to pause, and remain paused even when the streaming content has already loaded, and when the media player's buffer is full. Such pausing may be tolerable between two-party synchronization, but may negatively impact the viewing experience when additional participants are in the same viewing session/experience. This situation may be referred to as Failure Propagation.

Failure Propagation may be avoided by separating the source of the failure (i.e. the participant with the unstable network connection, the "failure source"), from other participants, by avoiding the broadcast of "buffer" events. For example, after the buffering of a video stream during playback, the failure source may be responsible for querying the current playback position and to stay synced with other participants. A query signal may be generated by the media player and provided to the video synchronization component 152 via a corresponding WS, for example to determine the current playback position of the group of participants. Other participants may periodically provide a playback signal to allow participants to expose their current status. By doing so, the failure source may be isolated from the rest of the participants so that the participant associated with the failure source may experience paused video while additional video data is buffered. The remaining participants may continue to experience video playback uninterrupted.

It may be noted, however, that repeated pausing and buffering for a participant with an unstable network connection may also result in frequent skipping or jumping to a later portion of a video as the media player attempts to "catch up". As a result, the participant may miss one or more portions of the content being played back. These effects may be especially noticeable when the participant is on a continuously slow or unstable network connection. For example, the time to buffer the video data may have resulted in the rest of the participants having progressed to a later time point in the video. In response, the media player of the participant with the unstable network connection may jump forward to the current playback time. More time may be used to buffer video data corresponding to this new current time. The process may repeat again, causing the repeated pauses and jumps within the playback of the video.

To address instances of continued buffering, 1) a participant's network speed may be detected dynamically within the client's local application by measuring the average download time based on the size of the video content being streamed and possibly downgrade the playback resolution (e.g. the video bitrate), and 2) provide an option to let the participant to opt out the synchronized viewing experience temporarily. In general, by downgrading the playback resolution, the participant may keep watching the video synchronously with other participants. In the case that the playback resolution cannot be downgraded further, the participant may be provided with an option to temporarily opt out of synchronized playback. To opt out of synchronized playback, the participant can direct the media player (e.g. through a "sync disable" button available on the interface) to ignore all synchronized streaming messages thereby continuing the video stream unabated. The participant may opt back in whenever they switch to a good network connection.

To protect the copyright holders of the digital media, digital rights management (DRM) through common encryption mechanisms may be used to prevent redistribution and theft. In the present embodiment, as shown in FIG. 3B, video synchronization component 152 can interface with both the participant's local client 102 and a licence management service 350 to authorize the playback of encrypted content. The video synchronization component 152 can act as an interception layer and provides authorization tokens to the client 102 which permits the client 102 (see e.g. Steps 1 and 2 of FIG. 3B) to obtain a licence (e.g. a one-time license with license duration and rental duration, steps 3 and 6 of FIG. 3B) for content playback while communicating through a backchannel with the licence manager to confirm the parameters of the playback license (see e.g. steps 4 and 5 of FIG.

3). DRM techniques may include, but are not limited to, Widevine DASH, Fairplay HLS, Widevine EME, Widevine Android, Widevine iOS, Silverlight Playready and Playready Mobile.

Signalling Protocol for Synchronized Video Playback

As described previously, playback control events may be sent and received by the video synchronization component 152 and propagated to other participants to synchronize video playback. The playback control component 152 may be implemented through a standalone server or a distributed server behind load balancers. In some cases a Web server implementing Node.js or any appropriate framework may be used. Communication may be made between a participant and the server using messages provided over an appropriate network connection. For example, in the case of a WS connection the messages may be communicated in the form of WS API calls. In other words, the playback control events may be formatted as a message prior to being sent or received between the participant's respective media player software and the synchronization component 152 implemented on the server. Table 1 shows example messages that may be sent or received to indicate various playback events or actions.

Referring to the sample messages of Table 1, parameters used in the messages can include "t" to denote an optional target client to focus synchronization on a subset of users, "u" to denote a user's or participant's unique identifier and "movie" to denote an identifier and title of a video. The messages may further comprise additional parameters such as parameter "a" to indicate a playback action (e.g. pause, play, skip etc.) and "time" to indicate a time point in the video. These messages may be exchanged between the media players of the participants (client-side) and the synchronization component 152 operating on a server (server-side). The messages may then be redistributed to one or more recipients.

During a synchronized video playback experience, a media player with a persistent connection to the synchronization component 152 may receive synchronization messages from the synchronization component 152 with instructions to alter the playback of a video. For example, a participant may choose to jump to a different part of a video. To do so, the participant may click a position on the scrubber bar 206 of the participant's media player to a desired time point. A corresponding message comprising the appropriate parameters to indicate a jump to a different time point may be generated and transmitted to the video synchronization component 152 and redistributed to the other participants to facilitate viewing of the video in a synchronized manner. The synchronization component 152 may perform minimal processing on these messages in to reduce overall latency, i.e. constraining it to the network latency. In some cases, if a forward seek to a future time point occurs and a participant has not fully downloaded the content for that future time, a "STPM_buffering" message may be sent indicating a stall in the playback. Once the buffer is complete, a "STPM_buffer done" message is sent.

With reference to FIG. 2A, in some cases, a participant may jump to a different time point by dragging and dropping the progress indicator 208 of the media player 202 to a desired time position along the scrubber bar 206 corresponding to a desired time point in the video. Alternatively the participant may press and hold the seek forward or seek backward, for example fast forward or rewind, buttons (not shown) that may be on the media player interface to direct the progress indicator 208 forward or backward along the scrubber bar 206. In these situations, a message may be generated and transmitted upon the participant having dropped the progress indicator 208 to the desired time position or released the seek forward/seek backward buttons.

Figure 1E:
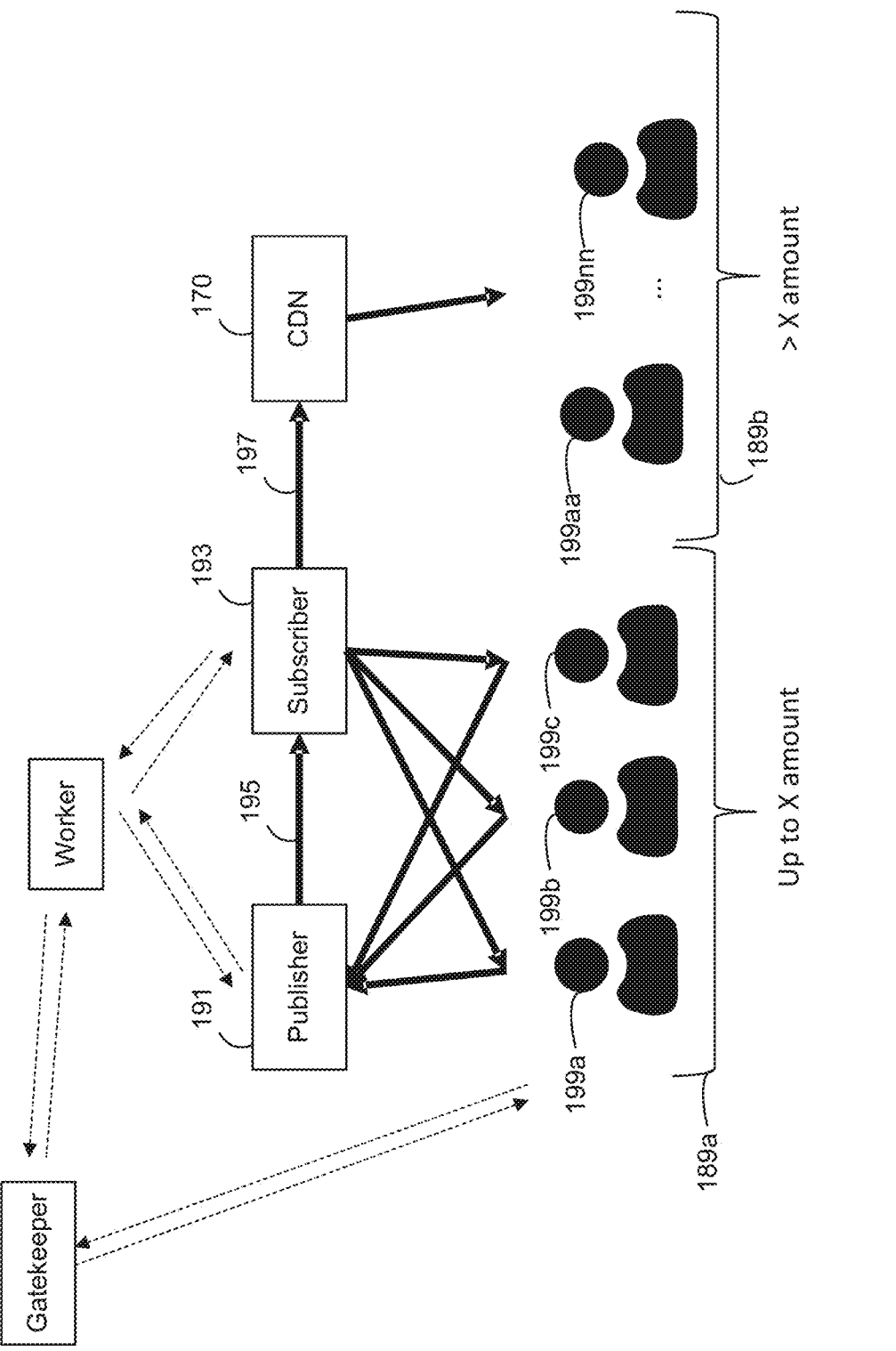
Figure 3A:
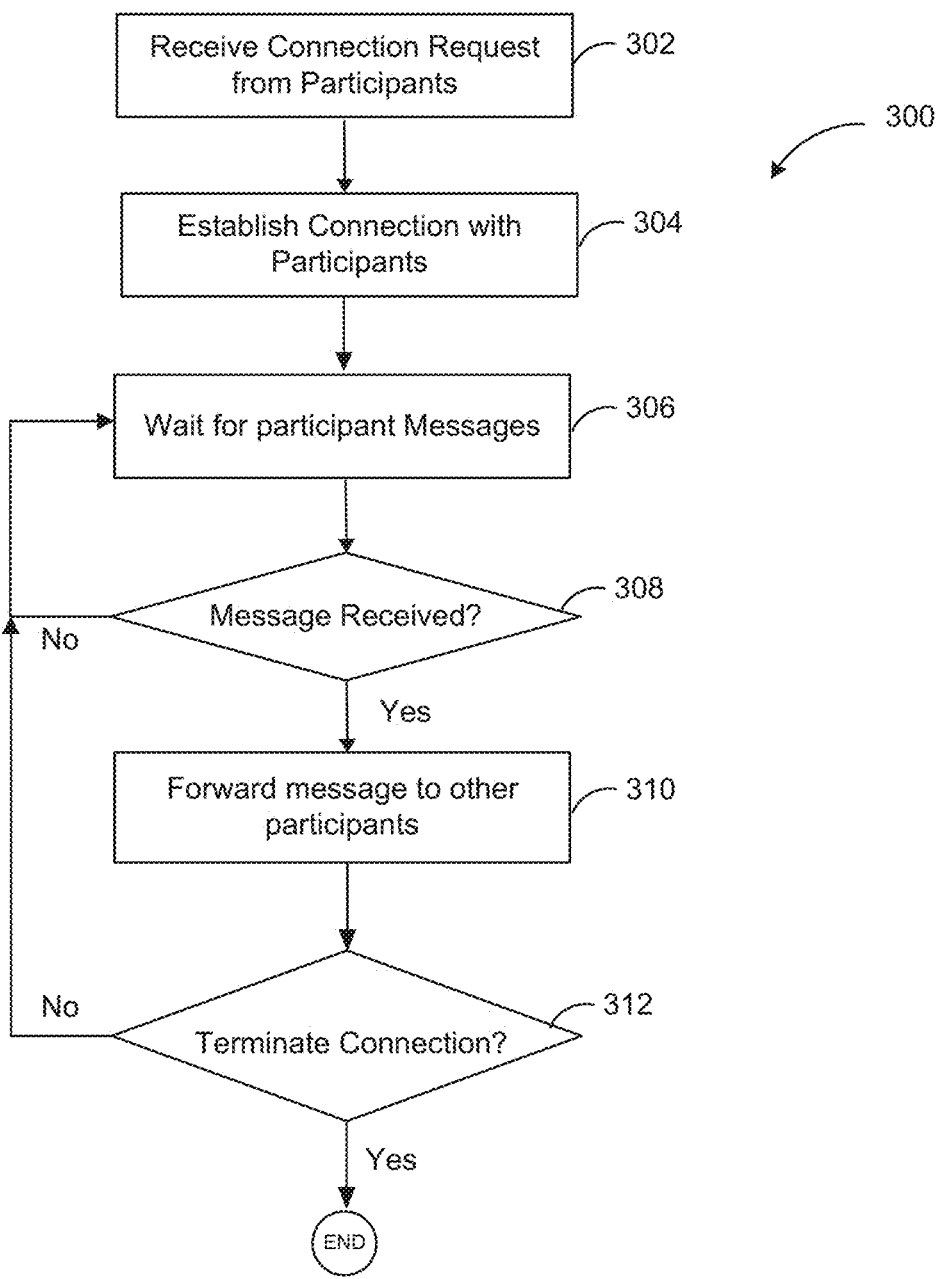
FIG. 3A is a flowchart diagram illustrating the steps of a method for synchronizing video playback, according to at least one embodiment.
Figure 3B:
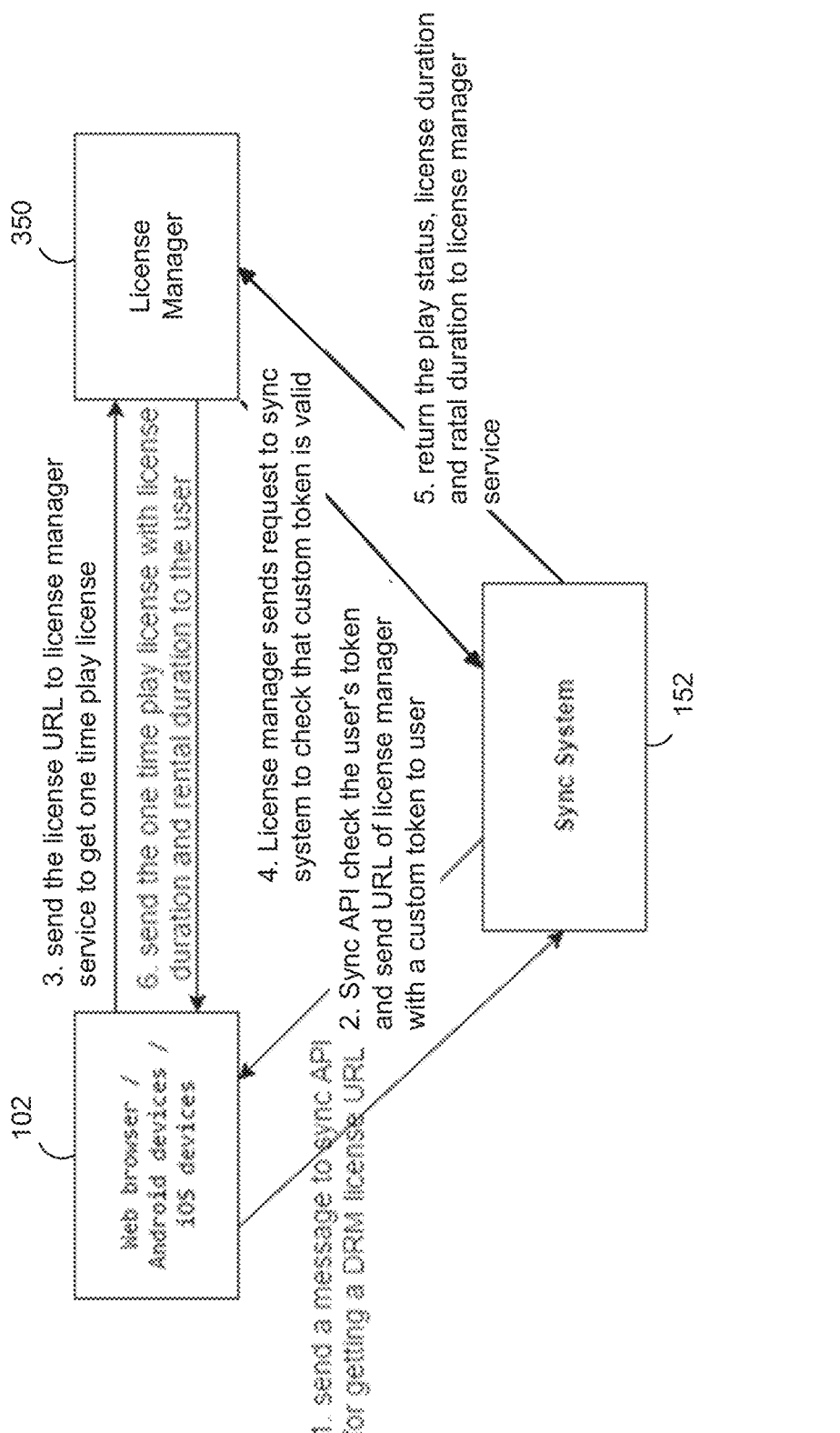
FIG. 3B is a flow chart diagram illustrating the steps for a method for digital rights management of copyright-protected content, according to at least one embodiment.

FIG. 3A is a flowchart describing an example embodiment of a method 300 for providing a synchronized video playback experience for two or more participants from the viewpoint of the video synchronization component 152 of FIGS. 1B to 1D. Participants may be invited or opt-in to join a synchronized video viewing experience, for instance a user currently in the either a group of participants (i.e. a group of publishing users) or a group of viewers (i.e. a distribution group) may invite another user to join them. Such invitations may include invitations to join a group of presenters (also known as publishers) whose participation may include transmitting a video signal of their own (see FIG. 5A). An invitation may be sent to invite someone to watch the synchronized playback experience as a member of a distribution group. The distribution group may interact with the synchronized video viewing experience using text chat (see FIG. 5A). Similarly, an invitation may be sent to a member of the distribution group to join the publishing group, or conversely a member of the distribution group may request to join the publishing group. Returning to FIG. 3A, the joining or opt-in actions may be handled by the non-persistent components previously described. The recipient user may accept or reject the invitation to the video experience. Upon accepting the invitation or joining the synchronized video experience, the participant's corresponding client application can generate a connection request to the video synchronization component 152. At step 302, a connection request form a participant may be received by the video synchronization component. The connection request may indicate the synchronized video viewing experience by an identifier generated for that experience. For example, when a participant invites other participant to start a synchronized viewing experience, an event identifier may be generated by the non-persistent components such as the OS. Functions component 124 of FIG. 1B, and events component 132 of FIGS. 1C and 1D may be used for this task. As shown in FIG. 1E, establishing a connection may involve determining a threshold of the streaming video experience to determine if a user should be added to a distribution group or a publishing group. This determination may involve comparing the current number of members of a publishing group to the threshold, or another metric associated with the synchronization of the media stream.

At step 304, a connection may be established with each of the participants. As described previously, a corresponding WS connection or any other persistent network connection may be instantiated for each participant. Upon establishment of the WS connection, the synchronized playback may begin. The synchronization component 152 may wait for messages from participants to facilitate synchronized video playback at step 306.

One of the participants (or publishing group users) may press the play button to begin playback of the video content. To start playback of a video, a message may be generated, for example, containing the action "STPM_play" (as indicated in Table 1) in message parameter "a" by one of the participants. When thousands of viewers are present, the hosts or organizers of the interactive experience can choose to disable playback controls by default and enable "moderators" to control playback. The message may also indicate the movie title to be played and the playback time point. For example the playback time point may indicate 0, corresponding to the beginning of the video.

At step 308, the synchronization component 152 may receive the message containing the "STPM_play" action. This message may then be distributed or forwarded to the other participants associated with this viewing experience using the respective WS established with these other participants. When these other participants receive the message from the synchronization component 152, the respective media player can parse the message and carry out the appropriate playback action, namely, play the specified video at time 0 (if a specific time is not provided). The media player corresponding to each of the participants may thus obtain the media from media repository 106 or the CDN 170, depending on the configuration of the system and begin playback of the video.

During the synchronized video playback experience, a participant may perform other playback actions such as pause or jump to another time point. As a result, a corresponding message containing these other actions may be provided to the synchronization component 152 and distributed to the other participants so that the action may be mirrored by the media players associated with the other participants. The process may be repeated any number of times until the synchronized video viewing experience is terminated. For example, the synchronized video playback experience may be terminated for all of the participants at the end of the video. The viewing experience may be terminated for a particular participant if that participant decides to close his/her media player window, while the playback experience may continue for the remaining participants. However in some cases, a particular participant may be granted moderator status as described previously. In this case, a moderator closing the media player or pressing the "stop" button may terminate the synchronized video playback experience (i.e. for all participants). To terminate, a corresponding "STPM_stop" action may be received by the video synchronization component 152. Furthermore, the persistent connections between the participants and the video synchronization component 152 can also be terminated at step 312 so that the synchronized video playback experience may end.

In some cases, the network connection of a given participant may deteriorate during the course of the synchronized video playback experience. In this case, the buffer memory of the participant's media player may be depleted and playback may be stalled. To avoid failure propagation as described previously, the media player detecting stalled playback may generate a query message to the video synchronization component 152 containing the "STPM_time_inquiry" in the "a" parameter to inquire into the current playback time of other participants. The video synchronization component 152 may maintain a list of the current playback time of all participants in non-persistent data store 114a which may be kept up-to-date with a periodic current time query to the participants. Upon receiving the periodic or ad-hoc time query message, the participant's corresponding media player may generate a time response "STPM_time_response" to indicate the current playback time. These responses may be received by the video synchronization component 152 and provided to the original sender of the origin query so that the media player may jump to a time point that is common to the other participants. As the number of participants in the video content synchronization session grows beyond a configurable threshold, a statistically significant number of participants may be randomly selected to report their current time.

In some other cases, a new participant may join the synchronized video playback experience after the experience has already started. Upon joining the experience, the new participant may generate a query message to the video synchronization component 152 containing the action "STPM_time_inquiry" to inquire into the current playback time of other participants. The media player of the new participant may jump to the time point that is common to all of the existing participants so as to be "synchronized" with the experience.

As described previously and as shown in FIG. 3B, when the copyright holders want to protect the content from unauthorized distribution, DRM may be enabled for the desired content. Upon joining the experience and detecting that the content protection is enabled, the media player of the new participant can send a security token assigned to the media player for the particular event (e.g. upon joining/registering) to the video synchronization component 152 with the action "STPM_get_token". If approved to view the content, a license manager URL may be returned with a new custom token. In turn, the participant may query the license manager URL for the content license with the action "STPM_get_license". The license manager can proceed to query the video synchronization component 152 with action "STPM_confirm_token" comprising the participant's custom token and if validated, component 152 can respond with the play status, license duration and rental duration for the content. The license manager can then proceed to respond to the participant with its license plus a number indicating the number of play permissions and lifetime of the license, i.e. its "duration". Furthermore, the license manager will also return the correct license to the client depending on its DRM type, e.g. Widevine, Playready or Fairplay.

As the number participants in the audience grow into the thousands, it may be inevitable that a small percentage of the participants will have unstable network connections or inadequate bandwidth to support a seamless synchronized viewing experience. To ensure that the majority of participants have an uninterrupted viewing experience, these few users may be forced out of synchronization. A "STPM_disable" action may be sent from the video synchronization component 152 to instruct the media player of the participant with an unstable network connection to operate in a pure stream mode, i.e. it will ignore select video sync messages and will not send sync feedback messages.

TABLE 1

| Sample Messages used in the signalling Protocol for Synchronized Video Playback | | | | |
|---|---|---|---|---|
| Event | Params | Action Name | Description | Sample Message |
| Play | none | STPM_play | User clicks Play button | socket.emit('sync', {t:123456, a:"STPM_play", u: 654321, movie:{id:789,title:"The Movie"}}); |

TABLE 1-continued

| Sample Messages used in the signalling Protocol for Synchronized Video Playback | | | | |
| --- | --- | --- | --- | --- |
| Event | Params | Action Name | Description | Sample Message |
| Pause | none | STPM_pause | User clicks Pause button | socket.emit('sync', {t:123456, a:"STPM_pause", u: 654321, movie:{id:789,title:"The Movie"}}); |
| Stop | none | STPM_stop | User clicks Stop/Done button or closes the player window | socket.emit('sync', {t:123456, a:"STPM_stop", u: 654321, movie:{id:789,title:"The Movie"}}); |
| Jump | time: the time it jumps to | STPM_jump | the playback jumps to somewhere [2] | socket.emit('sync', {t:123456, a:"STPM_jump", u: 654321, movie:{id:789,title:"The Movie"}, time:89_59}); |
| Buffer | none | STPM_buffering | The playback stalls due to insufficient content in the buffer | socket.emit('sync', {t:123456, a:"STPM_buffering", u: 654321, movie:{id:789,title:"The Movie"}}); |
| Done buffer | none | STPM_done_buffer | The user who stalled has done the buffering | socket.emit('sync', {t:123456, a:"STPM_done_buffer", u: 654321, movie:{id:789,title:"The Movie"}}); |
| Enter fullscreen | none | STPM_enter_fullscreen | The playback goes to full-screen mode. | Socket.emit('sync', {t:123456, a:"STPM_enter_fullscreen", u: 654321, movie:{id:789,title:"The Movie"}}); |
| Exit fullscreen | none | STPM_exit_fullscreen | The playback exits from full-screen mode. | Socket.emit('sync', {t:123456, a:"STPM_exit_fullscreen", u: 654321, movie:{id:789,title:"The Movie"}}); |
| Invite | none | STPM_invite | A user invites another user to watch a movie. | Socket.emit('sync', {t:123456, a:"STPM_invite", u: 654321, movie:{id:789,title:"The Movie"}}); |
| Accepted | none | STPM_accepted | The other user accepted the invitation. | Socket.emit('sync', {t:654321, a:"STPM_accepted", u: 123456, movie:{id:789,title:"The Movie"}}); |
| Declined | none | STPM_declined | The other user declined the invitation. | Socket.emit('sync', {t:654321, a:"STPM_declined", u: 123456, movie:{id:789,title:"The Movie"}}); |
| Text | text: the text | STPM_text | Users send text message to others. | Socket.emit('sync', {t:123456, a:"STPM_text", u: 654321, movie:{id:789,title:"The Movie"}, text:"hi there!"}); |
| Time Inquiry | none | STPM_time_inquiry | Inquiry the other user's current playback time. | Socket.emit('sync', {t:123456, a:"STPM_time_inquiry", u: 654321, movie:{id:789,title:"The Movie"}}); |

TABLE 1-continued

| | | Sample Messages used in the signalling Protocol for Synchronized Video Playback | | |
|---|---|---|---|---|
| Event | Params | Action Name | Description | Sample Message |
| Time response | time: the current playback time | STPM_time_response | Response to time inquiry. Notice that the time is in the same format of time in Jump event. | Socket.emit('sync', {t:123456, a:"STPM_time_response", u: 654321, movie:{id:789,title:"The Movie"}, time:89_59}); |
| Disable sync | none | STPM_disable | Sent from the server to tell the client to ignore further select sync messages and to not feedback sync status | Socket.emit('sync', {t:123456, a:"STPM_disable", u: 654321, movie:{id:789,title:"The Movie"}, }); |
| Get Custom Token | token: the users current token from sync | STPM_get_token | Responds with a custom token and the license manager URL | Socket.emit('sync', {t:123456, a:"STPM_get_token", u: 654321, movie:{id:789,title:"The Movie"}, token: <token>, url: "www.com"}); |
| Get DRM License | token: the custom token generated by get_token | STPM_get_license | If valid, responds with number of plays license plus license duration and rental duration. | Socket.emit('sync', {t:123456, a:"STPM_get_token", u: 654321, movie:{id:789,title:"The Movie"}, token:<token>, license: <string>, plays: 1, duration: 120}); |
| Confirm Security Token Valid | token: the custom token generated by get_token | STPM_confirm_token | If valid, responds with number of plays license plus license duration and rental duration. | Socket.emit('sync', {t:123456, a:"STPM_get_token", u: 654321, movie:{id:789,title:"The Movie"}, token: <token>, license: <string>, plays: 1, duration: 120}); |

35

Video Chat and Video Chat Broadcast Across Multiple Heterogeneous Platforms and Devices Technologies such as Adobe Flash require plugins to be downloaded to enable video chat/streaming. Such plugins may not be readily available across all devices. For example, Adobe Flash is not available for iOS devices. Moreover, decoding and streaming video is a resource intensive operation for many consumer grade devices. These devices may quickly reach resource (e.g. CPU, memory and bandwidth) exhaustion when facilitating a peer-to-peer video chat with more than 3 peers. Resource exhaustion may be compounded in a large-scale/conference bridge scenario as the mesh configuration generally used in these scenarios, i.e. the number of signaling links, grows at a rate of nodes[nodes-1]/2 with the number of nodes.

The identified issues may be addressed using the generation of individual streams of users engaged in video chat using different, locally supported, encodings; transcoding on the a server and rebroadcasting transcoded stream to users in video chat. However, latencies associated with this technique may provide a suboptimal chat experience. Additionally, the associated bandwidth costs associated with a server configured to transcode multiple video streams may be high. While different selective forwarding units (SFU) to facilitate video chat with greater than 3 peers may be used issues related to load balancing across a collection of SFUs related to stream routing may also arise. In particular, load balancing issues may arise in association with a) late joining of users to video chat sessions spread across multiple servers and b) increased latency due to geographically distributed server nodes. As such, a pure load balancer to SFU configuration may not provide adequate performance for a scalable (to thousands, tens of thousands or more) multi-participant video chat experience.

Figure 4A:
FIG. 4A is an image of an application interface for video chat, according to at least one embodiment.

As shown in FIG. 2A participants in a digital interactive experience may engage in video chatting in addition to sharing a common synchronized video playback experience. If the device used by a participant is equipped with video and audio capture components such as a camera and microphone, the application interface 200 of FIG. 2A may provide additional video display areas 220 to facilitate video chat between participants. However, if audio and video capture components are not present on a participant's device, they may still be able to observe other participants that are broadcasting video and audio content. Video chat functionalities may be established using persistent components such as video chat component 154 of FIGS. 1B to 1D. Persistent connections such as WS connections may be used to establish a communication link between an application providing video chat functionalities (the "chat application") to a participant and the video chat component 154 to establish a video chat session. Sessions may be established for two participants as shown in FIG. 2 or more participants as shown in in FIG. 4A.

Communication between a chat application and the video chat component 154 may be facilitated using messages similar to those used for synchronized video playback. Messages may be transmitted and received over the persistent connection such as a persistent WS connection. Table 2 shows example messages that may be sent/received to indicate various chat-related events or actions. Message parameters may include "t" to denote the participant being called (the "callee") that is the target client, "u" to denote the participant doing the calling, that is the "caller's" unique user identifier and "a" to denote the action to take (e.g. a call request, terminate call etc.). The messages provided to the video chat component 154 may be used in a handshake process to exchange information to establish a direct, low latency peer-to-peer video connection between video chat participants to transfer video chat data over the network 104. For example, in some implementations, video chat data such as video and audio may be transferred using peer-to-peer communication such as WebRTC (Web Real-Time Communication). Configuration data for a WebRTC session may be exchanged during the handshake process.

Figure 4B:
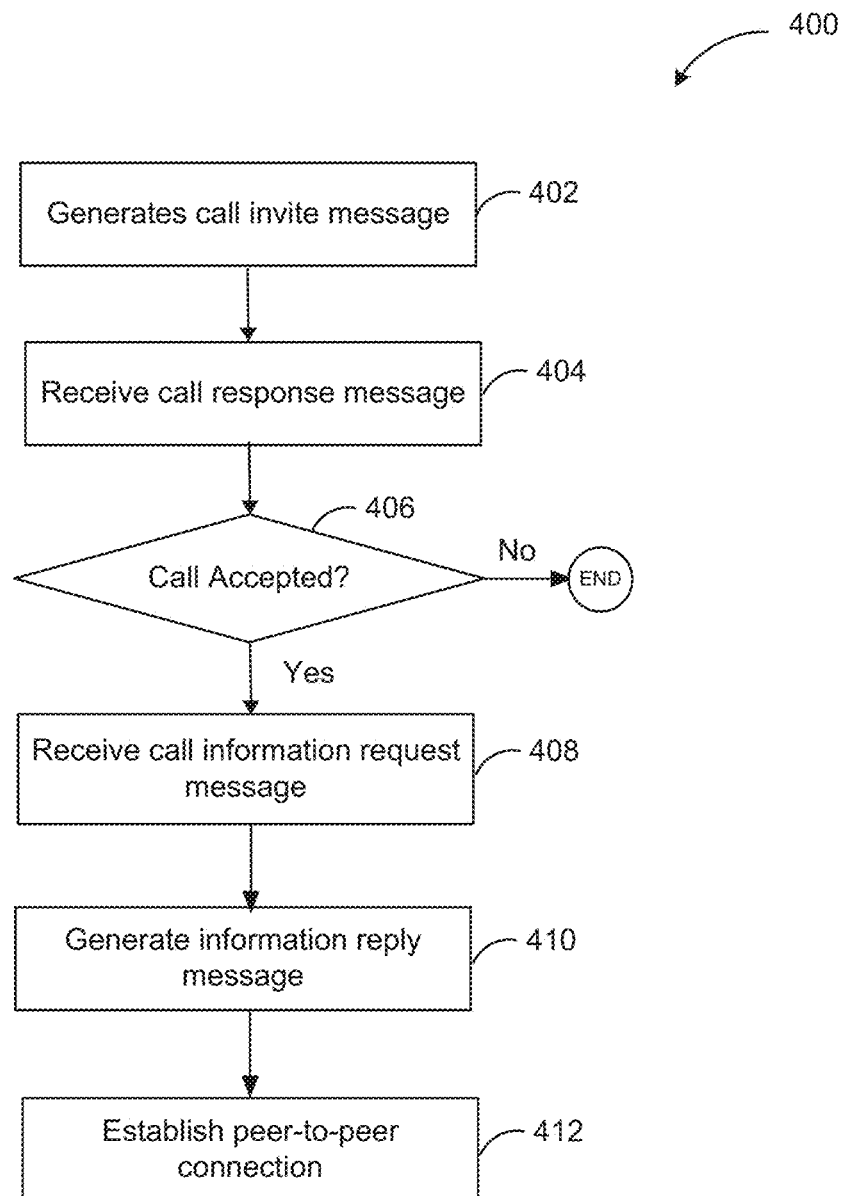
FIG. 4B is a flowchart diagram illustrating the steps of a method for establishing a video chat session, according to at least one embodiment.

FIG. 4B is a flowchart describing an example embodiment of method 400 for providing a video chat session. Specifically, method 400 describes the handshake process that between two participants, but may be extendable to a greater number of participants, as will be described in more detail subsequently. A participant wishing to invite another for a video chat, the "caller", may first access a video chat application (not shown) available in the application interface 200. The video chat app may provide a list of contacts that the caller may invite to join a video chat.

At step 402, upon the caller selecting a contact to call, the chat application generates a call invite message by indicating in the "a" parameter a call request action, for example "SVCW_invite" (see e.g. Table 2), the "t" parameter may indicate the user identifier of the recipient. The call invite message may be provided to the video chat component 154 and forwarded to the callee.

Upon receiving the call invite message containing the SVCW_invite action, the callee may answer to either accept or deny the call invite. A call response message indicating in the "a" parameter a call response using the action "SVCW_response" may be generated and returned to the caller via the video chat component 154. An additional "answer" parameter may indicate whether the call is accepted or denied.

At step 404 the caller receives the call response message. The caller's application extracts the information stored in the "answer" parameter, to determine if the caller accepted or denied the call invite.

At decision step 406, if the callee does not accept the call, the handshake process, and consequently the call process, may terminate. A notification may be generated to indicate to the caller that the callee does not wish to accept the call invite. In some implementations, an option to leave a video message may also be provided. Alternatively, if the callee accepts the call (i.e. the "answer" parameter indicates that the call is accepted), the process may proceed to step 408 in which the caller receives a call information request message generated by the callee. The call information request message can request the caller for the information to establish a direct peer-to-peer video chat connection. The "a" parameter of the call information request message may indicate the action "SVCW_Info_Inquiry".

At step 410, in response to the call information request, the caller may generate an information reply message setting the "a" parameter to indicate action "SVCW_info_reply" to indicate that the message contains information to establish the peer-to-peer connection. For example, if the peer-to-peer is a WebRTC connection, relevant information for the WebRTC connection would be provided.

At step 412 a peer-to-peer connection may be established between the caller and callee using the call information provided by the caller. Once the peer-to-peer connection is established, additional messages may be provided to the video chat component 154 to provide information related to status of the peer-to-peer video chat connection. For example, messages indicating that a peer-to-peer connection was successfully established may be generated by indicating in the "a" parameter "SVCW_answer". Additionally, upon termination of the call, the peer-to-peer connection may also be terminated. Another message indicating the termination of the chat session may also be generated, for example, by indicating in the "a" parameter "SVCW bye".

Broadcasting a peer-to-peer video chat to a large audience may be implemented using appropriate system architecture such as a selective forwarding architecture. Selective forwarding units (SFU) are able to terminate and originate video streams. In a large viewership scenario, there may be a large imbalance between the publishing participants, i.e. the chatters, and the subscribing participants, i.e. the viewers. To handle this imbalance, the forwarding unit may be split into two separate components, a publisher, and a subscriber.

FIG. 1E shows an embodiment of a split selective forwarding system comprising a publisher 191 and a subscriber 193. Publisher 191 may be configured to handle the incoming video streams being published by publishing participants 199a, 199b and 199c engaged in the video chat and forwards these streams along communication link 195 to the subscriber 193. Publisher 191 may also be referred to as a mixer or composer. In some cases, the functionality of the publisher 191 and the subscriber 193 may be performed by the same component or computer system. Participants who are publishing video or audio content 199a, 199b and 199c (for example, a video feed of themselves) can directly connect to the subscribing component 193. Participants or users who are involved in publishing content may be referred to as belonging to a publishing group 189a. All other participants who are not active in the video or audio chat can connect to media server 106 or CDN 170 where the subscribing component 193 has forwarded the media over media link 197 for mass distribution and consumption. The mass distribution of media content using content delivery network 170 may involve the use of a geographically distributed CDN such as Akamai or Amazon Cloudfront. Participants or users 199aa to 199nn who are not involved in publishing video or audio content may be referred to as belonging to a distribution group 189b that receives a video signal from the CDN 170. As shown in FIG. 1E, the distribution group may receive video content from the CDN 170, and the group may be very large including tens, hundreds, thousands, hundreds of thousands or even millions of group members (not shown). FIG. 1E shows an embodiment where a threshold (X) may be employed when adding users to the synchronized video playback experience. In one embodiment, when a user is added, for example 199nn, the system may evaluate a condition to determine which group to add the user to. In one embodiment, the condition evaluated may be the number of users currently in the publishing group. The groupings of users into the publishing group 189a and the distribution group 189b may be based on a decision made on the basis of the threshold condition.

TABLE 2

| Event | Params | Type Name | Explanations | Sample Code (syntax may differ) |
|---|---|---|---|---|
| Ask for info | none | SVCW_info_inquiry | Handshake Step 3 callee asks for initial config info | socket.emit('msg', {t:123456, a:"SVCW_info_inquiry", u:{id:654321, ...}}); |
| Answer with info | info | SVCW_info_reply | Handshake Step 4 caller replies with the initial config info | socket.emit('msg', {t:654321, a:"SVCW_info_reply", u:{id:123456, ...}, info:<NSDict>}); |
| Call request | none | SVCW_invite | Handshake Step 1 making a video chat call | socket.emit('msg', {t:123456, a:"SVCW_invite", u:{id:654321, ...}}); |
| Call response | answer, whether "accept" or "deny" | SVCW_response | Handshake Step 2 responding to a video chat call | socket.emit('msg', {t:654321, a:"SVCW_response", u:{id:123456, ...}, answer:"accept"}); |
| candidate | id label candidate | SVCW_candidate | ICE candidate (please refer RTCICECandidate-initWithMid:index:sdp) | socket.emit('msg', {t:123456, a:"SVCW_candidate", u:{id:654321, ...}, id:<NSString>, label:<NSNumber>,candidate :<NSString>}); |
| offer | sdp | SVCW_offer | PeerConnection offer (please refer RTCSessionDescription-initWithType:sdp) | socket.emit('msg', {t:123456, a:"SVCW_offer", u: {id:654321,...},sdp:<NSString >}); |
| answer | sdp | SVCW_answer | PeerConnection answer | socket.emit('msg', {t:123456, a:"SVCW_answer", u: {id:654321,...}, sdp:<NSString>}); |
| bye | none | SVCW_bye | PeerConnection bye | socket.emit('msg', {t:123456, a:"SVCW_bye", u:{id:654321, ...}}); |

Virtual Stage with Moderated Audience Participation

Figure 5A:
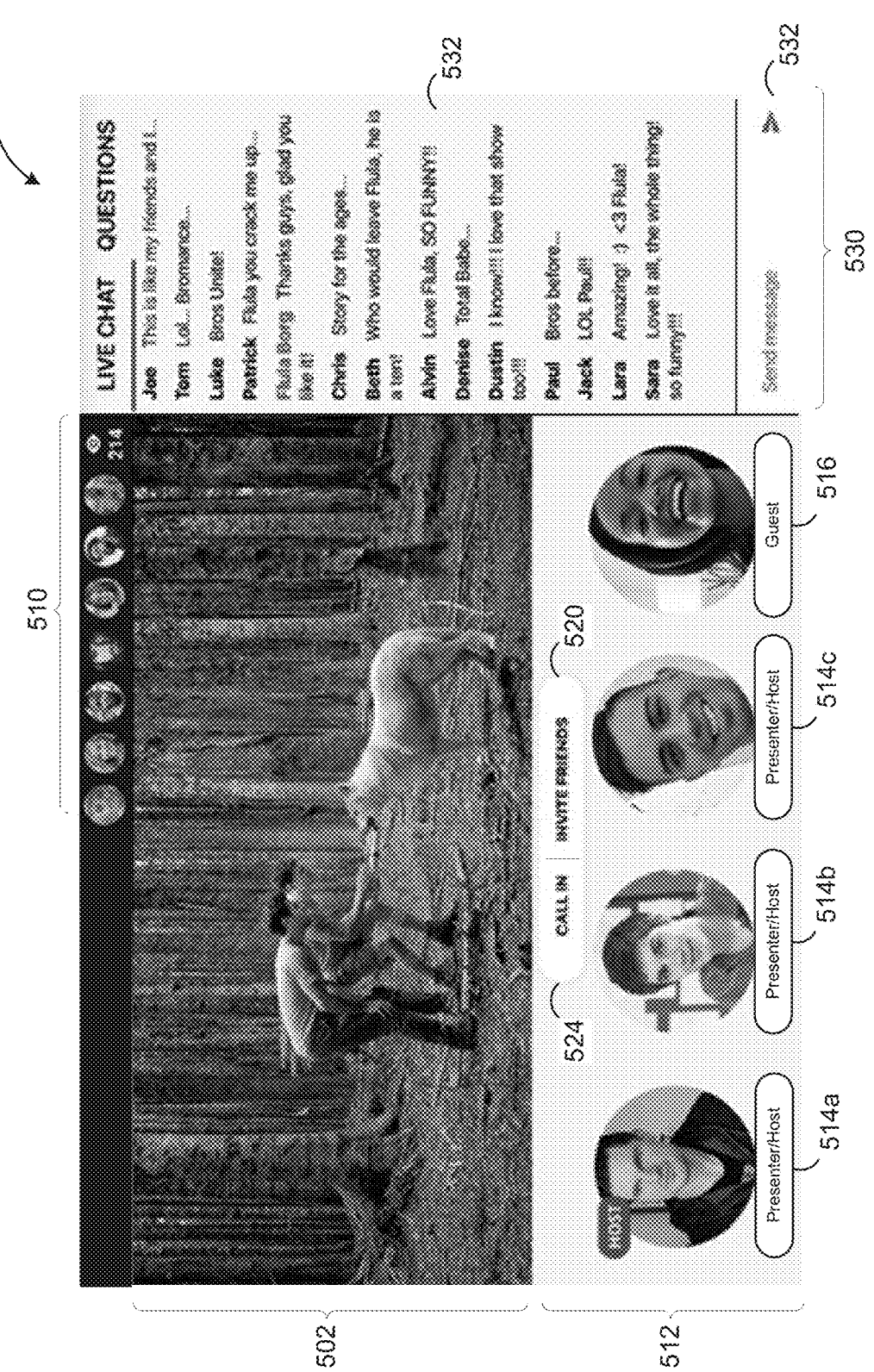
FIG. 5A is an image of an application interface for an interactive experience, according to at least one embodiment.

In some cases, the synchronized video playback experience may be integrated with video chat and video chat broadcast functionalities into a single application and interface to allow participants to join a virtual interactive presentation experience (hereinafter the "interactive experience"). FIG. 5A shows a participant interface 500A for participating in the virtual interactive experience. The interface may be a web application accessible using a desktop browser or an application executable on a mobile device (the "application"). A participant may browse through a list of available interactive experiences using the application to join. The list of available experiences may be maintained and stored in a data store 114 FIGS. 1A to 1D in conjunction with one or more of the non-persistent components such as the OS Functions 124 FIG. 1B, Events component 132 of FIGS. 10 and 1D. Upon selecting an interactive experience to join, the application may establish persistent connections (e.g. WS connections) with the one or more persistent components 110 to provide functionalities to the interface 500A. The interface 500A may comprise of a presentation area 502 for displaying a presentation, a participant status area 510, a stage area 512 for providing video streams of hosts or presenters on stage, and a chat area 530. Data messages similar to those described previously may be transmitted or received between participants of the experience.

The presentation area 502 may be used to display any desired media content. For example, the display area may be used to display a pre-recorded video clip such as a movie; a live video stream such as a video stream of a live event such as a sporting event or a concert; the display of a computing device such as the desktop or an active window within a desktop in a screen-sharing scenario; voice or audio data; a slide show of a series of still images; an app; a device; or components of an operating system. Multiple elements may also be shown. Furthermore, this area could be interactive so one or more participants may be able to interact (e.g. annotate/draw on the area) and the interaction may be broadcast. The display data for display area 502 may be published to an appropriate publisher module (not shown) and the data may then be provided to an appropriate data repository such as media repository 106 of FIGS. 1B and 1C or the CDN 170 of FIG. 1D. The CDN 170 may be used in situations where the participants are geographically dispersed. The CDN may have dedicated sub modules for distribution VOD 172 (e.g. pre-recorded video), live video 174 (e.g. live events), RTC 176 (e.g. video chat data), VoIP 178 (e.g. voice), screen (e.g. screen sharing), and operating system 182. The participant's application may generate a request to subscribe to the published display data on the media repository 106 or CDN 170 to obtain the display data from for the display area 502. Without the media repository 106 and CDN 170, the participant's may directly connect to the source of the display data, which may overload the source. As such using the repository 106 and CDN 170 acting as a subscriber module which provides a more efficient method of distributing data to a large number of participants.

A host or moderator may be given control of the display area 502. The playback actions (or interactions) related to the display area 502 may be synchronized amongst all the participants in the interactive experience as discussed previously. As such, a participant's display area may not include any playback controls. Additionally, the moderator may have control over the type of data being presented in the display area. For example, the moderator may switch from displaying a pre-recorded video sequence to displaying a live video stream. Switching between media sources may be provided via an appropriate synchronization message in the manner described previously. For example the message may contain the action "STPM_play" (see Table 1) in which media information under "title" parameter may indicate a media identifier corresponding to a different media source.

The participant status area 510 may be used to indicate the number of viewers or participants in the present interactive experience. For example as shown on the interface 500A of FIG. 5A, there are 214 viewers or participants present. As the interactive experience progresses, additional participants may join and other participants may leave the interactive experience. The participant status area 510 may also indicate profile images of participants as shown in FIG. 5A. Live videos, images. avatars, virtual/augmented/mixed reality representations of select participants may also be shown in the participant status area. The layout may be changed in real-time or according to a predetermined format. Transformations may be applied to the items above. For example, the size of the images may be increased or decreased. Updates related to the functionality and appearance of the interface such as a count of the active users may be supplied using a using a persistent component such as the signal component 156 of FIGS. 1C and 1D. User data may be shared between the signal component 156 and the stats component 128. During the interactive event, the application may establish a persistent connection such as a WS connection to the signal component 156. The stats component may be updated upon a participant joining the interactive experience. Any updated participant information may thus be provided through the signal component 156 to interface to update the status indication area 510.

A live text chat area 530 may enable participants to interact with other participants in the interactive experience. The text chat features may be provided by the text chat component 150 of FIGS. 1B to 1D. For example, upon joining the interactive experience a participant's application may establish a persistent connection such as a WS with the chat component 150 to provide chat-related services. The chat WS may be used by the application to send text entered into the text entry area 532. Chat text entered by other users may be received from the chat component 150 and displayed in the chat display area 532. In some cases, the live chat area may also include additional entry tabs to allow participants to submit written questions to the presenters/hosts 514a-c.

In some implementations, live text data shared/analyzed by text data to the bot component 158 or auto moderator component 160. These components may be used to identify and flag inappropriate text entries for the auto moderator 160 so that these entries may be edited or automatically filtered.

The stage area 512 may be used to show the presenters or hosts 514a-d of the interactive experience. The stage area 512 may be used to display representations of the presenters or hosts 514a-c. The representations may be images or live video streams obtained from the video and audio capturing equipment used by each of the presenters or hosts 514a-c to participate. The representations can also be avatars, 2D or 3D virtual models, non-photorealistic models, or augmented/mixed reality models. The moderator of the interactive experience may flag particular participants (i.e. based on their unique user IDs) as presenters or hosts 514a-c, and "push" these hosts onto the stage area 512. The video streams may be integrated as a video chat as discussed previously.

It may be noted that a difference between the present interactive experience and the video chat experience described previously is that subset of the total number of participants are chosen to join in the video chat, which may then be broadcast to a large audience. As such, the use of peer-to-peer connections described previously may not be implementable especially given a large number of participants. In the present case, participants chosen to be presenters/hosts by the moderator may establish a video chat session as described above, in which the moderator initiates the call request. However, instead of establishing a peer-to-peer connection (e.g. WebRTC connection) with another chat participant, a peer-to-peer with the video chat component 154. In turn, the video feed from the host/presenters 514a-c may re-routed to the media repository 106 or CDN 170 for distribution, for example, via the RTC sub-module 176. The application may then populate the stage area 512 with live video chat streams of the presenters/hosts 514a-c to many participants allowing for scalability.

During the interactive experience, a participant may invite his or her friends to join the interactive experience. For example, upon depressing the invitation button 520, a participant's contact list appears. The user receiving the invitation may accept or reject it, and in the case they accept it, the user may be added to the participant group (also known as the publishing group). The contact list may appear based on a query of the user's component 126. A message may be generated to invite the recipient of the invitation to join the interactive experience.

Also during the interactive experience, a participant (a "caller") may wish to join the interactive experience by "calling in" or "Joining stage" to interact with the presenters/hosts 514a-c via video interaction. A caller who calls in may be added temporarily to the stage area 512 to appear on stage as a guest 516 to interact with the presenters/hosts 514a-c. The caller may create a request to the moderator to join the publishing group (indicated in FIG. 1E as 189a).

The participant wishing to call in may press the call-in button 524. In response, the application may generate a notification to the moderator to enable the moderator to interview or screen the caller. Upon receiving the call in notification, the moderator may initiate a private video chat with the nominee participant and may interact with them to determine their suitability for the stage. If the moderator agrees on the suitability of the nominee participant, they are able to approve them and add them to the participant (or publishing) group. The video chat may be initiated as described previously, using a peer-to-peer connection. Upon approval by the moderator, the caller may be queued by the moderator to be the next in line to be presented on the stage area 512. For example a list of queued participants may be maintained by the persistent data store 114a. If the moderator deems the participant is ready to appear on the stage area 512, the moderator will "push" the video chat stream of the participant by publishing (i.e. rerouted) to the media repository 106 or CDN 170 for distribution and they will appear as a guest 516 to the audience. If the guest 516 on the stage area 512 behaves in a manner that may be deemed inappropriate for the interactive experience, the moderator may "kick" or remove the caller's video chat stream from the stage area 512. For example, a message indicating the guest's user identifier and an action code corresponding to removal of the guest may be issued by the moderator to the Video Chat component 154. In response the video feed of the guest provided to the media repository 106 or CDN 170 may be terminated.

Figure 5B:
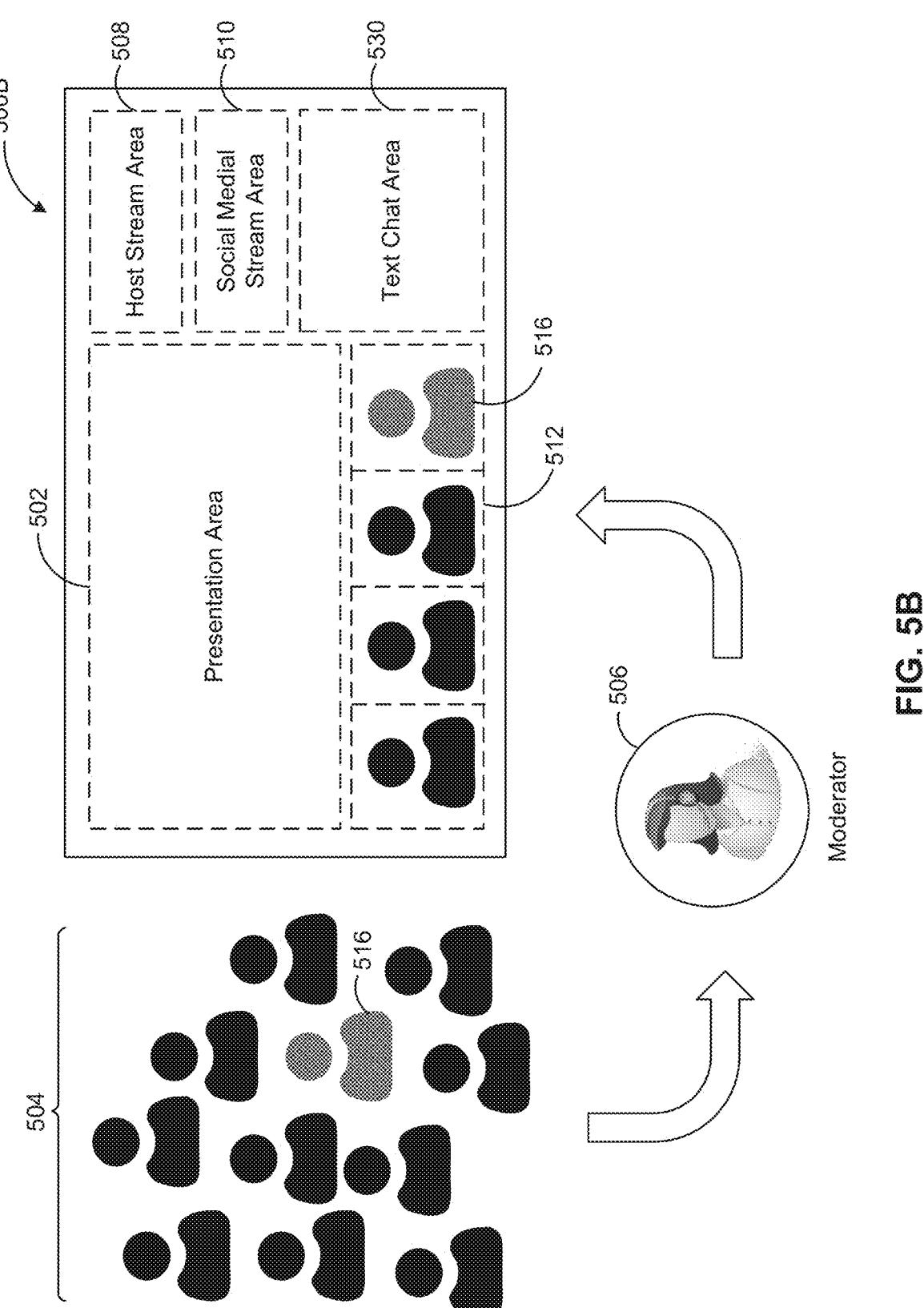
FIGS. 5B and 5C show an application interface for an interactive experience, according to at least one embodiment.
Figure 5C:
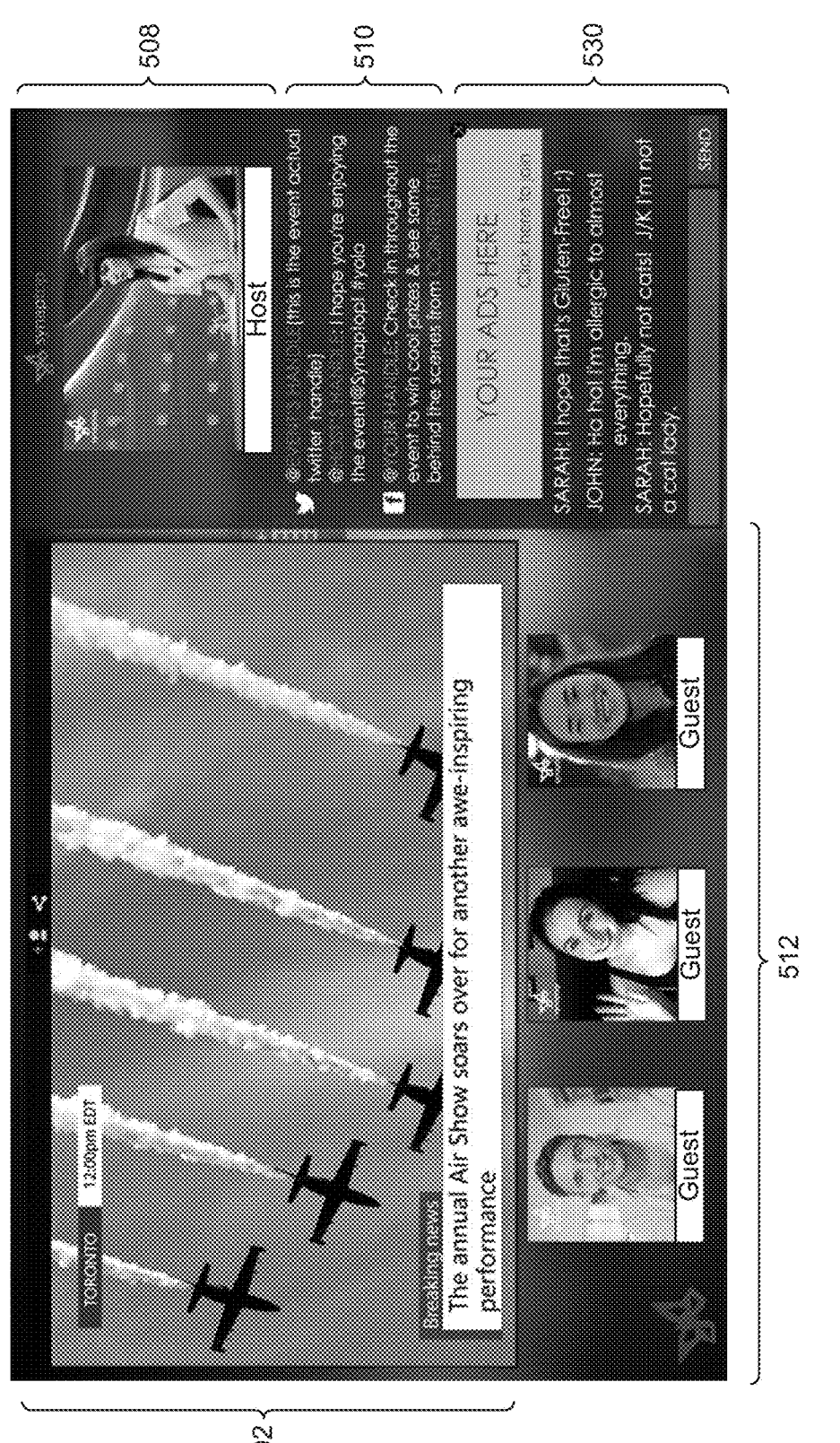

FIGS. 5B and 5C illustrate an implementation of another interface 500B for an interactive experience. The interactive interface 500B may be used in an online interactive event in which members of an audience 504 may register online and join the event. The presentation area 502 may be configured to display a live video feed or a presentation. As shown in FIG. 5C, the presentation area 502 may be showing a live feed of an aerobatic show.

A host may be provided in a dedicated host stream area 508, which displays a live video stream of the host. The host may be located in a studio or at another appropriate location (e.g. at a live event) for facilitating the interactive experience. The host may be providing information in addition to those displayed in the presentation area. The host may also be in communication with a moderator 506 who is not visible to viewers to invite or screen audience members to participate in the interactive event on a stage area 512 as guests. For example, the moderator 506 may screen audience member 616 to prior to inviting the audience member 516 onto the stage area 512 using a manner similar as to those described previously. Audience members who do not appear on the stage may still interact in real-time by using the text chat area 530 or post messages on social media (e.g. using the appropriate hashtags). Messages obtained from social media networks may be displayed in a social media stream area. Related advertisements may also be inserted where appropriate. For example, the text chat component 150 may be configured to access social media streams and advertising services for related/relevant social media posts and advertising, respectively. The use of social media feeds may also be used to invite additional audience members to participate in the interactive experience.

Figure 6:
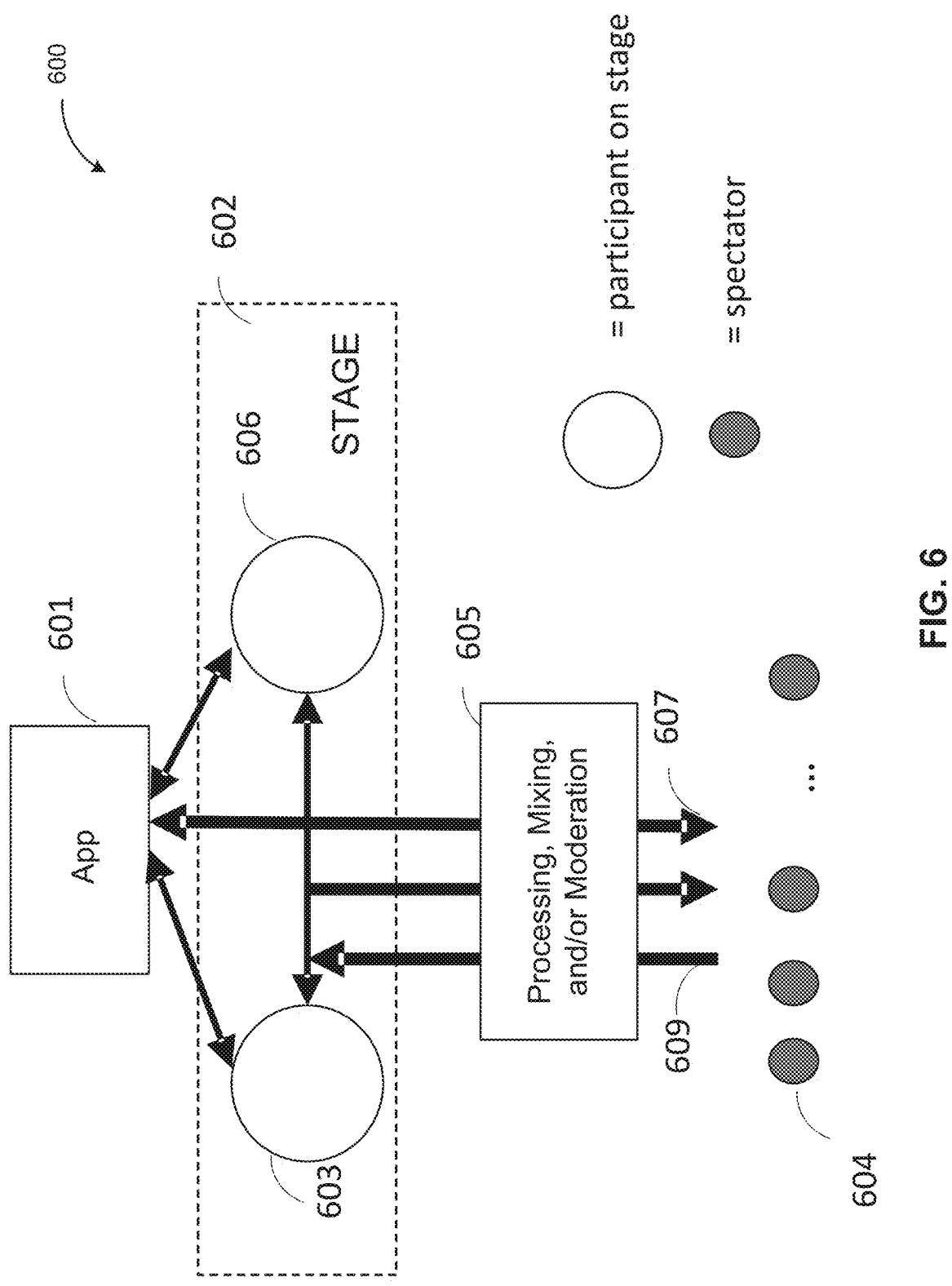
FIG. 6 is an illustration of a system for providing an interactive digital experience, according to at least one embodiment.

Reference is now made to FIG. 6 wherein one exemplary embodiment of a system 600 for providing an interactive digital experience is shown. Two or more participants (or users) 603 and 606 may engage in the synchronized use of an app 601 (e.g. within a virtual operating system) and/or digital media content and/or virtual machine and/or elements of an operating system. In some embodiments App 601 might include media playback such as a movie or television show, or a live media source (for example, a sporting event). The participants 603 and 606 may be members of a publishing group, and their own video feeds may be combined as shown in other embodiments such that there is a stage area 602 of a composite video stream sent to a distribution group 604 that includes a plurality of users. The synchronized use of the App 601 (including media playback) may include discussion of the contents of App 601 by users of the publishing group, markup of the contents of the app 601 including highlighting or drawing, or control of the App 601 and may include modifications of the playback behavior. At 605 a mixer or composer combines the media signal from App 601 and publishing users 603 and 606 to form a composite media stream 607. These participants may also engage in video chat and/or text chat while being engaged in the synchronous or asynchronous use of such apps and/or digital media content and/or virtual machine and/or elements of an operating system. The media stream from App 601, the plurality of users in a publishing group and the interactions such as text chat received from the distribution group 609 are composed into a composite media stream by mixer or composer 605. This synchronous (or asynchronous) session may be private (referred to as private mode) or it may be broadcast to select other viewers or friends (referred to as friend mode) or it may be broadcast to any participant who wants to access (made public, referred to as public mode). Participants 603 and 606 who are interacting (using apps together and/or video/text chatting) may be presented on a virtual stage 602.

In the private mode, users on the stage 602 can see each other and use app 601 or and/or digital media content and/or virtual machine and/or elements of an operating system together synchronously or asynchronously, while users not on the stage 602 may not be able to see the users on the stage. In the friend mode, spectators 604 selected by one or more participants 603/606 on stage 602, can view the synchronized use of apps 601 and/or digital media content and/or virtual machine and/or elements of an operating system. These spectators 604 (users in the distributor group mentioned above) may also interact with the participants on stage and their app 601 and/or digital media content and/or virtual machine and/or elements of an operating system in ways selected by the participants on stage 602. These interactions 609 may include actions and messages sent to the users 603 and 606 in publishing group on the stage 602. These spectator interactions 609 may further be combined in the composite media signal 607. The interactions 609 may be communicated with the users in the publishing group 603 and 606, and may be referred to as an interaction stream. For example, interactions may be facilitated by sending/receiving WS messages as described above. Limitations may be set by participants on stage 602 so that certain actions/ messages generated by the spectators 604 may be corresponding to actions such as text entries, synchronizations etc. may be processed (i.e. accepted and provided to other participants) or intercepted (i.e. action denied, and the action would not be provided to other participants). Similarly, in the public mode, all spectators 604 can view the synchronized use of apps and/or digital media content and/or virtual machine and/or elements of an operating system. They may also interact with the participants on stage and their app and/or digital media content and/or virtual machine and/or elements of an operating system in ways selected by the participants on stage.

A paywall may be implemented, for example, using payment processor component 120 of FIG. 1D, to require participants to pay prior to joining a session with participants on stage. Furthermore, any of the spectators 604 may be able to join the stage if chosen by a moderator in an exemplary embodiment. In another exemplary embodiment, participants may be added to the stage automatically if they meet a certain criteria, for example, they have been tagged by the moderator as a celebrity, a guest, someone who has purchased a VIP ticket, or someone who has invited a certain number of friends to join the event. In yet other embodiments, addition of participants to the stage area may be rate limited. As an example, consider two participants who are watching a movie in a synchronized manner. As they click on play, pause or seek, both participants see the same frame. These participants may be on stage 602 and may video chat or text chat with each other. These participants may choose to make their session public in which case spectators 604 can synchronously watch the movie with the participants who appear on stage 602. Spectators can express their interest in joining the stage by, for example, clicking on a button available on the spectator's interface or, if using a mobile device, shaking their mobile device in exemplary embodiments. These actions may cause the generation of a request message indicating the spectator's desire to join the stage. The participants on stage 602 or a moderator or multiple moderators can receive the request and select a spectator or multiple spectators to be push to the stage, in a manner similar to those described previously, to interact with the participants on the stage through video chat and/or to engage with them in the use of apps and/or digital media content and/or virtual machines and/or elements of an operating system. If multiple moderators are present, any one of them can select or a group decision may be made. Alternatively, a set criteria may be implemented to automatically push spectators to stage. Spectators 604 can see the newly pushed/added participant on the stage 602. It may be noted that the number of spectators may be small or large.

Figure 7:
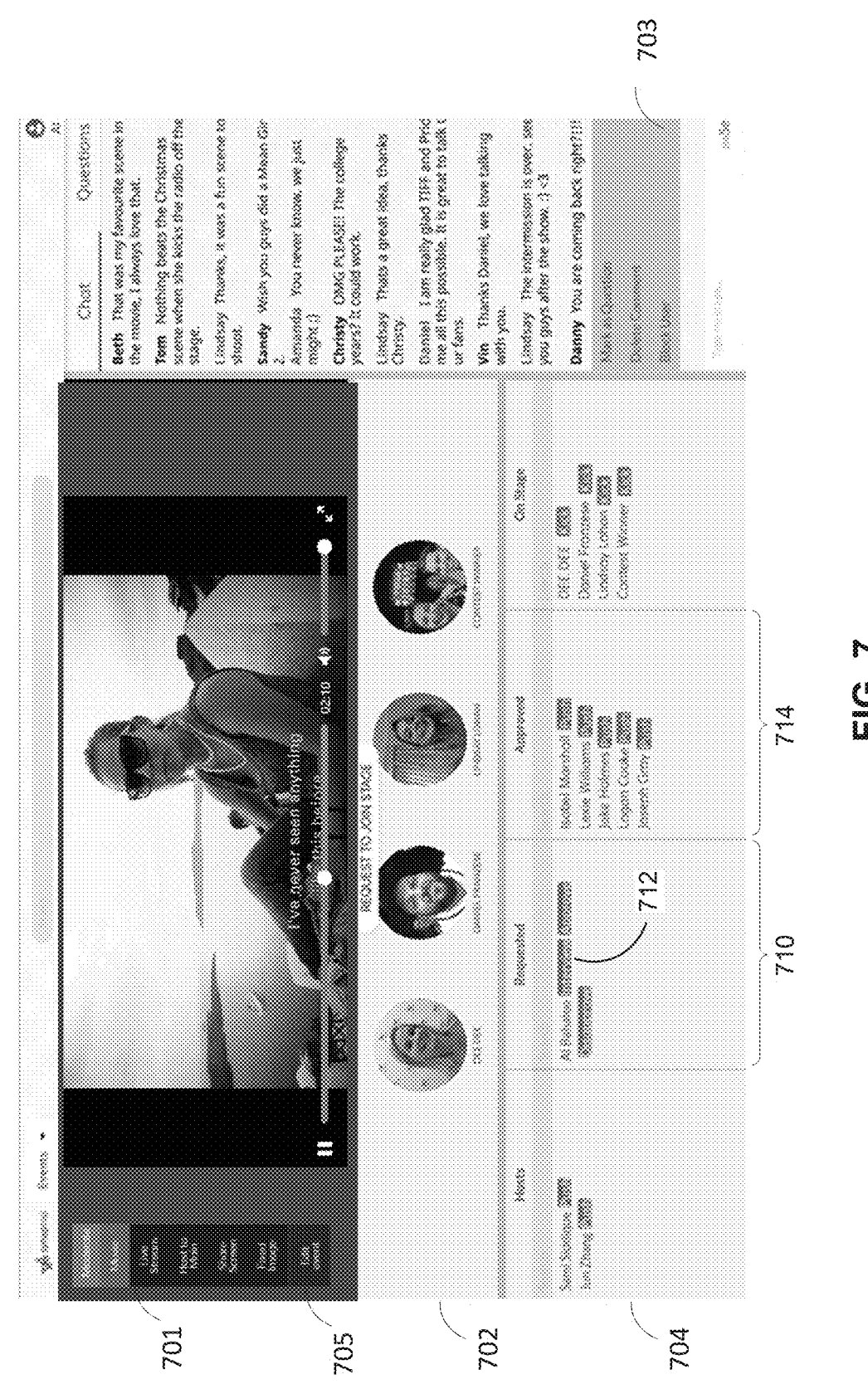
FIG. 7 is an image of a moderator portal interface, according to at least one embodiment.

Reference is now made to FIG. 7 wherein a moderator portal 700 for the virtual interactive experience is shown in an exemplary embodiment. The interface may be a web application accessible using a desktop browser or an application executable on a mobile device. In an exemplary embodiment, the moderator portal 700 may be considered a specialized version of the participant interface that offers additional mechanisms to control the interactive experience. The moderator portal 700 can control what participants see and interact with, and which participants go on the stage area. The moderator portal 700 can allow the moderator to configure and control elements residing within non-persistent components 112 and persistent components 110 of FIGS. 1B-1D. For example, the moderator portal 700 may allow a moderator to set the date and time of an event and set the price of an event (e.g. by configuring the events component 132 and payment processor component 120).

The moderator portal 700 may include but is not limited to: (1) A real-time mixing component 701 that allows mixing of any digital content in real-time and the pushing of this to the presentation area 502 of the participants interface 500A and 500B, (2) A scheduling component 705 that allows a moderator to schedule content to be pushed to participants, for example via event component 132; (3) A stage area 702; (4) A moderation area 704 for selecting participants to push to the stage; (5) A chat area 703 with chat moderation capabilities. In an exemplary embodiment, when a participant clicks on "Call in" or "Join Stage", as shown in FIG. 5A, the participant gets added to a "requested" queue 710. A moderator may select individuals from a list and either push them directly to the stage or interview them first by clicking on the interview button 712. The interview mode may, as described previously, establish a video chat between the moderator and the chosen participant. If the moderator deems that the interviewed participant is appropriate, then the interviewed participant can added to the approved list 714 or pushed directly to the stage. The moderator can also remove participants from the stage at any time. The selection of participants may also be based on other factors such as how many other participants a participant invites, how active they have been on social media, how much they have paid etc.

The chat moderation area 703 may be used to control the chat area 530 of FIGS. 5A-5C. It may include automated and manual filtering for removing/blocking profanity, suicide threats, or malicious activities. The chat moderation area 703 can also be configured to allow the moderator to delete comments and block users (e.g. from entering text). Artificial intelligence or machine learning systems may be implemented to automatically block comments in the chat area 530 and to automatically detect questions and rank them.

The interactive system of FIGS. 1A-1D may further be used for shopping. A host may present a product in the presentation area 502 and talk about it on the stage 512 of FIG. 5A or host stream area of FIGS. 5B and 5C. It may be appreciated that the layout may be interchangeable and elements may be moved around. They can also be moved around in real-time using the appropriate messaging commands generated by the moderator, for example. The moderator portal 700 may include a counter showing the number and amount of sales. This may be displayed live to the moderator and also to participants. The moderator portal may also be used as a triage to direct participant questions or sales to specific units such as a specific customer service group or a sales group.

The chat area 530 may include options for participants to get noticed. The chat area 530 may allow participants to buy special indicators such as emojis, labels or other content to stand out and get noticed by hosts/presenters/moderators. The chat area 530 may also allow users to pay hosts or other participants on stage via payment processor component 120 of FIGS. 1B-1D. The chat area 530 may also allow participants to shop. Bots operated by bot component 158 of FIG. 1D, for example, may be present in the chat area 530. These bots may be used to answer questions that participants may have. For example, bots may be used to answer questions about a product that is being demonstrated in the presentation area 502 or the stage 512, by parsing the text entered by the participants to determine the context and the question being asked. An appropriate answer may be provided based on the information obtainable in the data store 114a or from data contained the non-persistent components.

Figure 8:
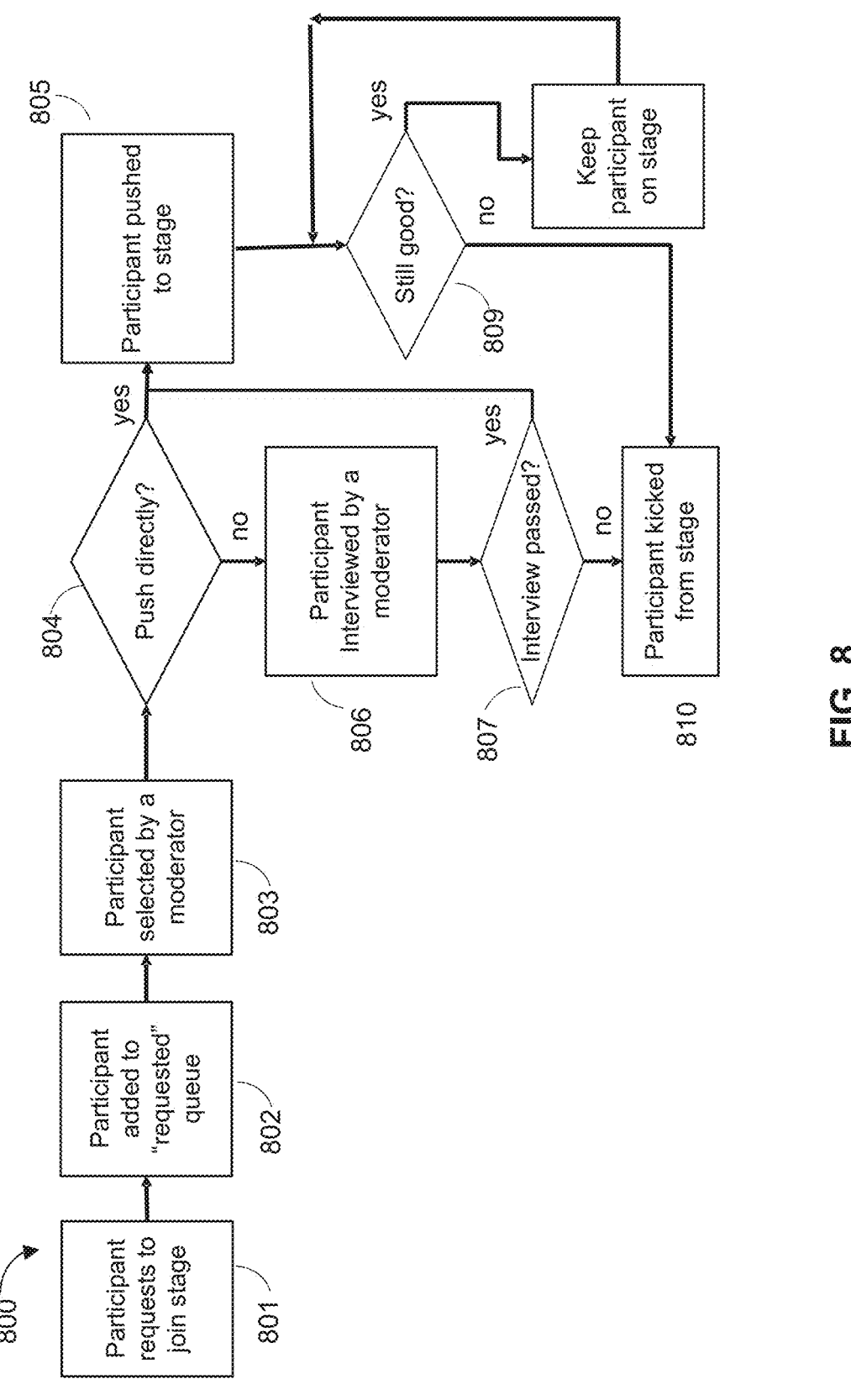
FIG. 8 is a flowchart diagram illustrating the steps of pushing participants on to a virtual stage, according to at least one embodiment.

Reference is now made to FIG. 8 wherein a flowchart illustrating the steps of a method for pushing participants on a virtual stage 512 are shown according to at least one exemplary embodiment. At step 801 a request to join the stage is received from a participant when the participant clicks on a "join stage" or "call in" button or shakes the participant's mobile device the participant joins the stage. The participant is then added to a "requested" queue at step 802 as shown, for example, in the "requested" queue 710 FIG. 7. The participant may then be selected by a moderator based on facts on the participant available via the moderator portal 700 (such as the age, gender, location, merchandise purchased, tickets purchased, social media activity, sales activities etc.). At the selection step 804, the moderator may push the participant directly to the stage at step 805 or interview the participant at step 806. At the interview step 807, the moderator can push the participant to the stage (Step 805) or remove the participant at step 808. While the participant is still on stage, the participant may be monitored and kept on stage at step 811 or removed at step 810. In the description above the "steps" may have associated states in the persistent and non-persistent components of the system.

Figure 9:
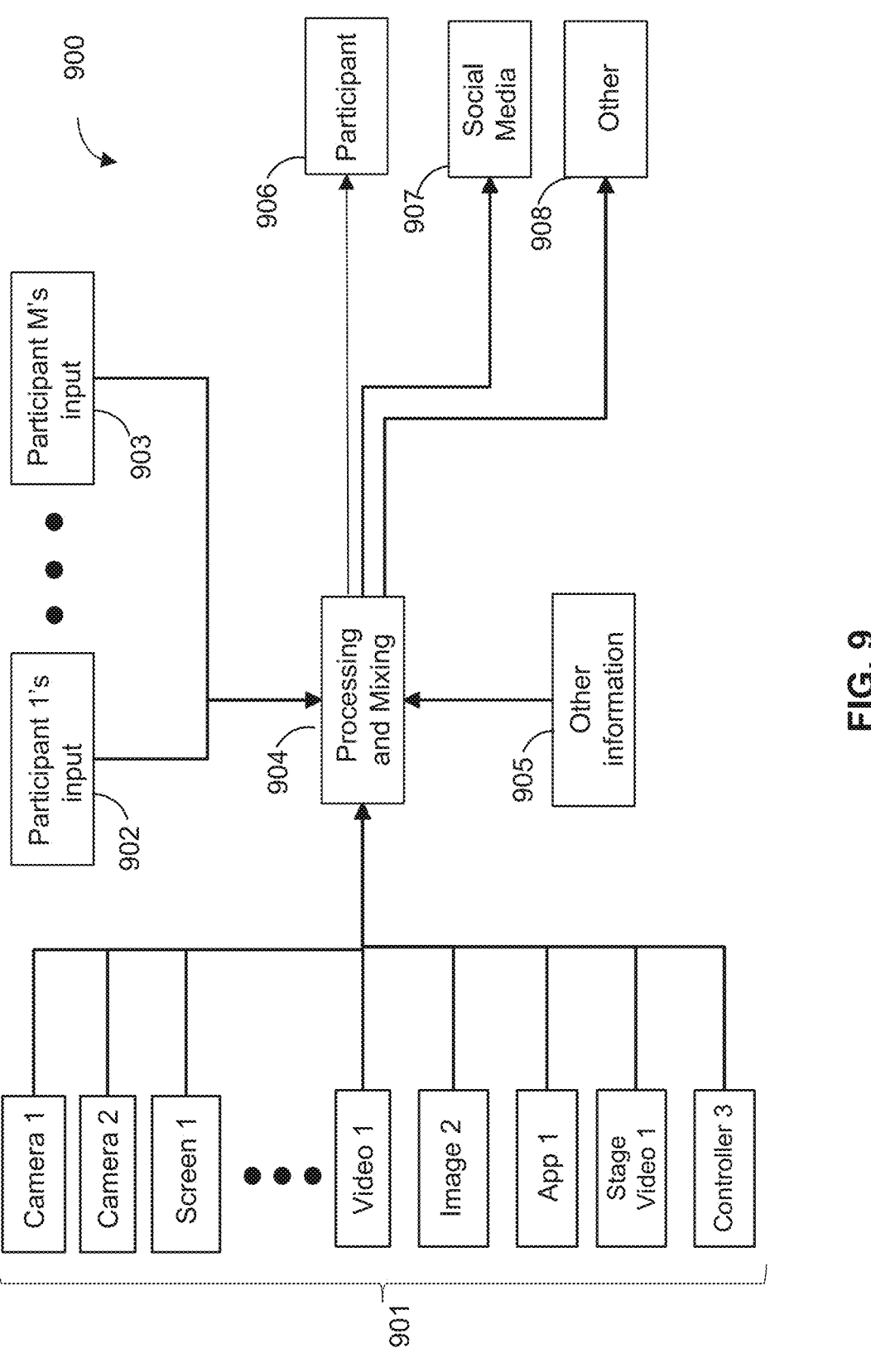
FIG. 9 is a dataflow diagram illustrating the steps for pushing content to participants, according to at least one embodiment.

Reference is now made to FIG. 9 wherein a dataflow diagram illustrating the flow of data in a method for pushing content to participants is shown according to at least one exemplary embodiment. The moderator portal 700 provides the moderator access to a number of data sources 901 comprising any of the following: one or multiple camera feeds, video capture feeds of one or more screens, pre-recorded video or videos, image(s), app(s), stage video feed(s), controller(s), collective stats, together with participants' input 903 and other information 905. Examples of a participant's input include keyboard, touch, game device, and gyroscope data from a participant. Other information 905 may include prior knowledge or live data such as the weather, social media, data gathered from the internet, etc.

These data sources 901, participant's input 902, and other information 905 may be provided as input to a processing and mixing unit 904 which processes the data.

Examples of processing at the processing and mixing unit 904 include any linear, non-linear, or other function or mapping. The output of the processing and mixing unit 904 can then be pushed to the participant 906 (e.g. content may be pushed to the presentation area 502 or the stage area 512 or a combination thereof). The output may also be pushed to social media or other outlets comprising but not limited to over the air broadcast and cable broadcast. The output may be pushed live in synchronization with the interaction system or asynchronously. The output may include a live video feed that may be pushed to other media 908 or live platforms for example over the air TV, satellite TV, cable TV, radio, etc. During a live TV or cable broadcast or a broadcast on the interaction system 100A-D of FIGS. 1A-1D, participants may be able to use the interaction system 100A-D to interact with the hosts or with apps using, for example, persistent data connections such as WS and providing data messages to the appropriate components as described above. As an example, during a game show broadcast, participants can hit a buzzer or play a game with the host or other participants. Participants can also interact with each other. For example, participants may play a game with each other and the best participant or group of participants in each game round rise(s) to the next level. This way the best player/participant in a large audience can propagate to the top.

In some embodiments, transcoding may be implemented at the processing and mixing step 904 during which various content may be stitched into a single video ("rendered view") and delivered to large audiences. This rendered view may be delivered to the participants or they may be delivered the interactive components of the presentation 502 and stage 512 areas. In one exemplary embodiment, participants may be provided a rendered view and the participants approved for the stage may be provided with the interactive view.

Figure 10:
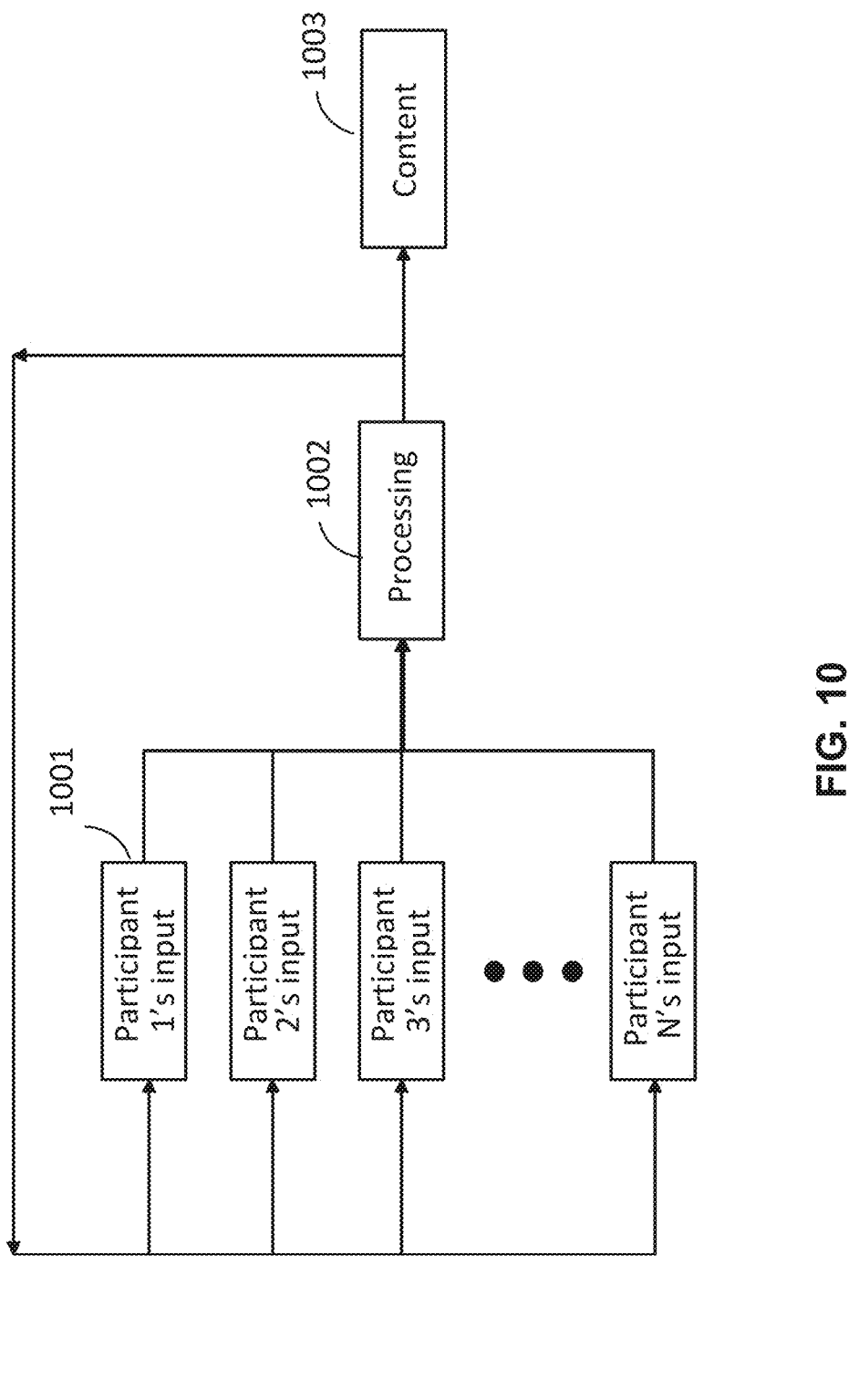
FIG. 10 is a dataflow diagram illustrating the steps for an interactive broadcast, according to at least one embodiment.

Reference is now made to FIG. 10 wherein a dataflow diagram illustrating the flow of data in a method for an interactive broadcast is shown according to at least one exemplary embodiment. Input data may be collected from participants or spectators and processed to influence content received by participants and/or spectators. For example, the interaction system 100A-D of FIGS. 1A-1D may allow for mass audience participation. Participant input 1001 (also referred to herein as user input) may be processed by input processor 1002 to influence content generated by content generator 1003 presented to the participants, for example, in the presentation area 502 or the stage area 512 of FIGS. 5A-5C. The content generated by content generator 1003 may also be referred to as a composite interaction stream. In one example, the interactive event may be a sing-along using the interaction system wherein the audio from the entire audience may be superimposed by input processor 1002 and presented to participants.

Other forms of digital signal processing may be by at the input processor 1002. For example, in the context of a contest, the interface presented to the participants may include a buzzer. Depending on a participant's interaction with the buzzer and with the stage area, he/she may be propagated up (i.e. given more attention). This method may also be used to allow crowdfunding during a live interaction event on the interaction system 100A-D. Forms of participant input include among other options: a game console, keyboard input, touch input, a drawing pad, etc.

In some embodiments, the interaction system 100A-D may be transaction enabled. In a crowdfunding context, participants can, in real-time or post event, invest in a company presenting on the stage 512 or in the presentation area 502. Participants can also, in real-time or post event, buy/shop products being presented on the stage 512 or in the presentation area 502 of FIGS. 5A-5C. Multiple stages of processing may be executed by the appropriate persistent and non-persistent components to carry out the desired functions. For example, input from participants may be processed through be machine learning and computer vision algorithms. Peer-to-peer interaction may also happen between participants. Optionally, in some embodiments, the output of the input processor 1002 may be used to influence the user's input. For example, if the context of an interactive game in which multiple options are present, a participant's input can limit the response options available for other participants, so that some of the options may become unavailable and greyed out.

The stage area 512 may include audio and/or video from the participant who joins stage or calls in. It may include a virtual/augmented reality representation of the participant or a non-photorealistic rendering of the participant. The presentation area 502 may include a video feed, an app, images, screen capture video feed, 3D objects, 360° video, and/or virtual/augmented reality in an exemplary embodiment. Participants may have multiple points of entry on the presentation area 502. For example, if a 3D object is displayed in the presentation area 502, multiple participants may manipulate/control it. This manipulation/control may be broadcast to spectators. In an exemplary embodiment, all participants and spectators or a subset of them may be allowed to manipulate/control/interact with the presentation area. For example, if a whiteboard is displayed, any participant/spectator may be allowed to write on it. The annotations may be transmitted as WS messages, for example to the input processor 1002. The presentation may also include a shared virtual computer that participants, spectators or a subset of them see. Sketches/pictures from participants may be pushed or distributed to the presentation area 502. Participants selected from the spectators may be displayed on the presentation area. Their video feeds or profile images may be displayed. Participants may be allowed to take selfies or pictures with celebrities on stage 512. A repository may be used to verify the authenticity of such selfies. Participants can also play games with hosts or other participants using the available system resources.

In an exemplary embodiment, text chat 532 with large audiences may be broken into smaller groups wherein participants in the same group may see comments of participants within the same group. The comments of participants on the stage area and/or the hosts' comments may be propagated to all chat groups within an event. Chat comments may be voted up or down and popular comments may be pushed to all chat groups. Participants can also elect to see comments from their friends (who may be active in the same or different chat group).

In an exemplary embodiment, if participants are engaged in virtual/augmented reality in the presentation area 502 or on stage 512, and have virtual/augmented/mixed reality goggles on, eyes and surrounding areas in the field of view covered by such goggles may be stitched onto virtual models or live video feeds of the participants. Augmenting eyes on participants' faces may allow for a more natural conversation in a virtual/augmented/mixed reality world. Augmentation of eyes may happen on the participant's video feed on the stage area 512. The participant's video feed may also be used to render on the participant's 3D or 2.5D model. The users' eye movement and eye expressions may be tracked and rendered on the participant's virtual model.

Numerous specific details are set forth herein in order to provide a thorough understanding of the exemplary embodiments described herein. However, it will be understood by those of ordinary skill in the art that these embodiments may be practiced without these specific details. In other instances, well-known methods, procedures and components have not been described in detail so as not to obscure the description of the embodiments. Furthermore, this description is not to be considered as limiting the scope of these embodiments in any way, but rather as merely describing the implementation of these various embodiments.

The invention claimed is:

1. A system for providing a digital interactive synchronized experience, the system comprising:
    a host server comprising an interaction system configured to:
        receive, from a first participant, a request to join a synchronized media experience;
        establish a connection between the first participant and a video synchronization component;
        receive, from a plurality of users in a publishing group, respective media streams comprising at least one of an audio stream and a video stream;
        compose, at a mixer, a composite media stream comprising an application stream, at least two of the media streams from the publishing group, and an interaction stream comprising user input from a distribution group;
        transmit the composite media stream to a content delivery network (CDN) for distribution to the distribution group;
        wherein the video synchronization component is configured to:
            receive playback control signals from at least one participant,
            propagate synchronization signals configured to provide synchronized playback at the publishing group and the distribution group, and
            identify a set of participants experiencing unstable network conditions and suppress transmission of buffer-related synchronization signals from the set of participants.

2. The system of claim 1 wherein the subscriber sends the composite stream comprising an interaction stream from each user in the plurality of users to a distributor comprising a content delivery network, a second plurality of users in a distributor group receiving the composite stream from the content delivery network.

3. The system of claim 2 wherein the composite stream instead comprises:
    the interaction stream from each user in the plurality of users and each user in the second plurality of users.

4. The system of claim 3 further comprising:
    a playback action comprising a user identifier, a playback event, and an action message, and
    wherein the plurality of users and the second plurality of users receive the playback action and change a playback of the application stream.

5. The system of claim 4 wherein the application stream comprises providing a set of instructions to a user application running locally to the user.

6. The system of claim 1 further comprising:
    a publisher receiving an application stream and the plurality of respective media streams corresponding to a plurality of users in the publishing group;

the publisher sending the plurality of respective media streams to a subscriber, and
    the subscriber composing the application stream and at least two of the plurality of respective media streams into a composite stream and sending the composite stream to the plurality of users in the publishing group, wherein the composite stream is sent simultaneously as the plurality of respective media streams is received.

7. The system of claim 1 wherein the video synchronization component is configured to initiate a query-response protocol, and wherein a participant's device, associated to at least one of the set of participants, is configured to:
    transmit a playback time inquiry to the video synchronization component;
    receive a current playback position in response; and
    adjust playback of a respective media content on the participant's device to match with the received playback position.

8. A method for providing a digital interactive synchronized experience, the method comprising:
    providing, at a host server, an interaction system configured to:
        receiving, from a first participant, a request to join a synchronized media experience;
        establishing a connection between the first participant and a video synchronization component;
        receiving, from a plurality of users in a publishing group, respective media streams comprising at least one of an audio stream and a video stream;
        composing, at a mixer, a composite media stream comprising an application stream, at least two of the media streams from the publishing group, and an interaction stream comprising user input from a distribution group;
        transmitting the composite media stream to a content delivery network (CDN) for distribution to the distribution group;
        wherein the video synchronization component is configured to:
            receiving playback control signals from at least one participant,
            propagating synchronization signals configured to provide synchronized playback at the publishing group and the distribution group, and
            identifying a set of participants experiencing unstable network conditions and suppress transmission of buffer-related synchronization signals from the set of participants.

9. The method of claim 8, further comprising:
    receiving, by a publisher, an application stream and the plurality of respective media streams corresponding to a plurality of users in the publishing group;
    sending, by the publisher, the plurality of respective media streams to a subscriber, and
    composing, by the subscriber, the application stream and at least two of the plurality of respective media streams into a composite stream and sending the composite stream to the plurality of users in the publishing group, wherein the composite stream is sent simultaneously as the plurality of respective media streams is received.

10. The method of claim 9, wherein the subscriber sends the composite stream comprising an interaction stream from each user in the plurality of users to a distributor comprising a content delivery network, a second plurality of users in a distributor group receiving the composite stream from the content delivery network.

11. The method of claim 10, wherein the composite stream comprises:

the interaction stream from each user in the plurality of users and each user in the second plurality of users.

12. The method of claim 11 wherein the application stream comprises providing a set of instructions to a user application running locally to the user.

13. The method of claim 8, wherein the video synchronization component is configured to initiating a query-response protocol wherein a participant's device, associated to at least one of the set of participants, is configured to:

transmitting a playback time inquiry to the video synchronization component;

receiving a current playback position in response; and adjusting playback of a respective media content on the participant's device to match with the received playback position.

* * * * *